(12) United States Patent
Okubo et al.

(10) Patent No.: US 10,029,297 B2
(45) Date of Patent: Jul. 24, 2018

(54) APPARATUS FOR FORMING A BLANK FOR FINISH FORGING FOR A FORGED CRANKSHAFT FOR A THREE-CYLINDER ENGINE AND METHOD FOR MANUFACTURING A FORGED CRANKSHAFT FOR A THREE-CYLINDER ENGINE USING THE SAME

(71) Applicant: NIPPON STEEL & SUMITOMO METAL CORPORATION, Tokyo (JP)

(72) Inventors: Junichi Okubo, Amagasaki (JP); Kenji Tamura, Takatsuki (JP); Kunihiro Yoshida, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 148 days.

(21) Appl. No.: 15/118,174

(22) PCT Filed: Feb. 18, 2015

(86) PCT No.: PCT/JP2015/000772
§ 371 (c)(1),
(2) Date: Aug. 11, 2016

(87) PCT Pub. No.: WO2015/129208
PCT Pub. Date: Sep. 3, 2015

(65) Prior Publication Data
US 2017/0173664 A1   Jun. 22, 2017

(30) Foreign Application Priority Data

Feb. 27, 2014   (JP) .................. 2014-036730

(51) Int. Cl.
*B21K 1/08*   (2006.01)
*B21J 1/04*   (2006.01)
(Continued)

(52) U.S. Cl.
CPC .................... *B21K 1/08* (2013.01);
*B21J 1/04* (2013.01); *B21J 1/06* (2013.01);
*F16C 3/08* (2013.01);
(Continued)

(58) Field of Classification Search
CPC .... B21K 1/08; B21K 1/00; B21J 5/025; B21J 1/06; B21J 1/04; F16C 3/08; F16C 3/06; F16C 2220/46; F02B 2075/027
See application file for complete search history.

(56) References Cited

FOREIGN PATENT DOCUMENTS

CN   102548684   7/2012
JP   2008-155275   7/2008
(Continued)

*Primary Examiner* — Moshe Wilensky
(74) *Attorney, Agent, or Firm* — Clark & Brody

(57) ABSTRACT

In a forming apparatus, movable journal dies and stationary journal dies retain rough journal portions of a preform blank therebetween, and reference crank pin die and movable crank pin dies contact rough crank pin portions thereof, and in this state, the movable journal dies and the movable crank pin dies are moved axially toward the reference crank pin die and the reference crank pin die and the movable crank pin dies are moved in a direction perpendicular to an axial direction. With this, weighted rough arm portions are axially compressed to reduce their thickness to that of weighted arms of a forged crankshaft, and the rough crank pin portions are pressed in the direction perpendicular to the axial direction to increase an amount of eccentricity to that of the crank pins of the forged crankshaft.

17 Claims, 20 Drawing Sheets

(51) Int. Cl.
    *B21J 1/06*           (2006.01)
    *F16C 3/08*          (2006.01)
    *B21K 1/00*         (2006.01)
    *F02B 75/02*        (2006.01)
    *F16C 3/06*         (2006.01)

(52) U.S. Cl.
    CPC ........... *B21K 1/00* (2013.01); *F02B 2075/026* (2013.01); *F16C 3/06* (2013.01)

(56) References Cited

FOREIGN PATENT DOCUMENTS

| | | |
|---|---|---|
| JP | 2011-161496 | 8/2011 |
| JP | 2012-161819 | 8/2012 |

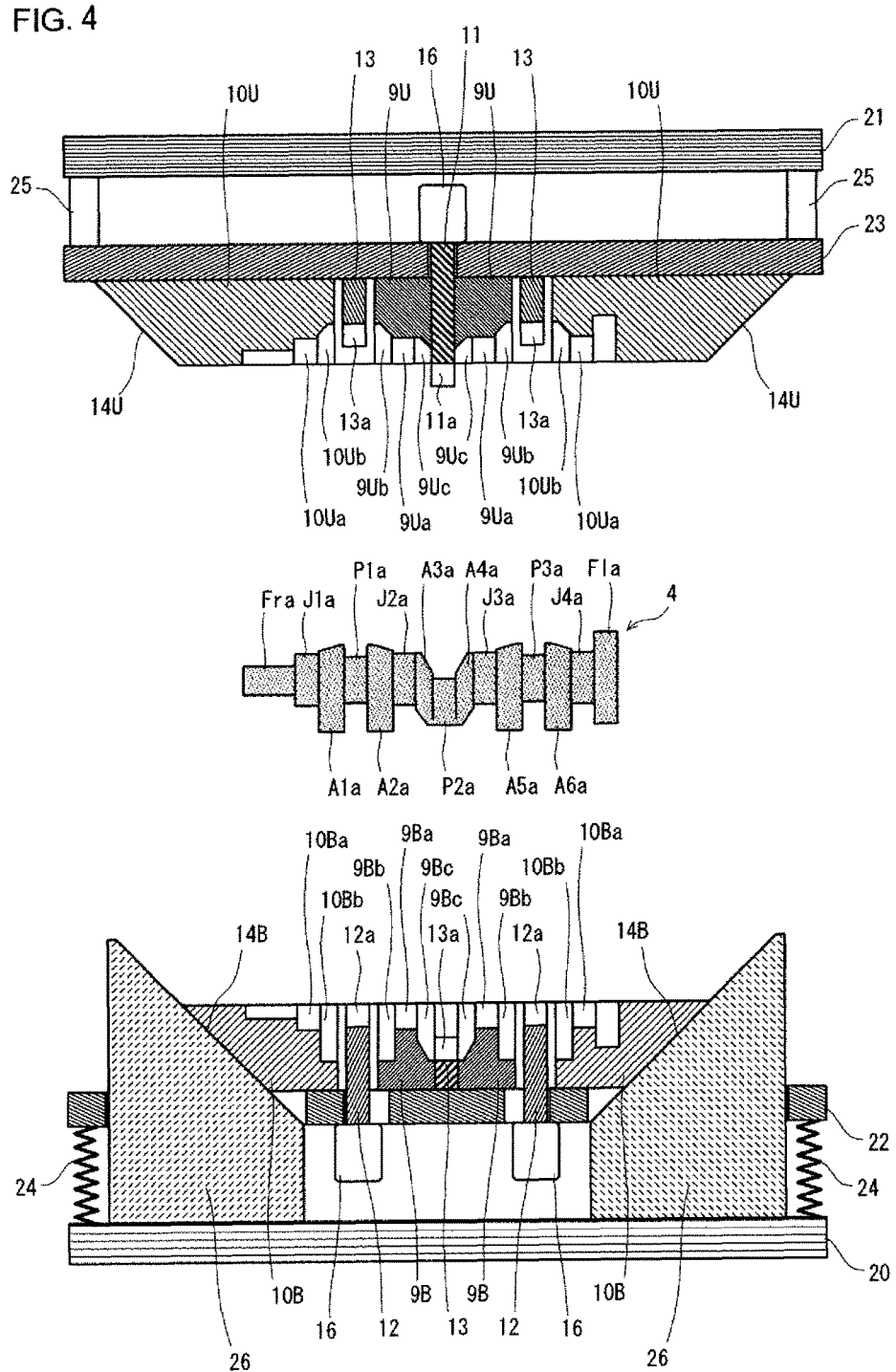

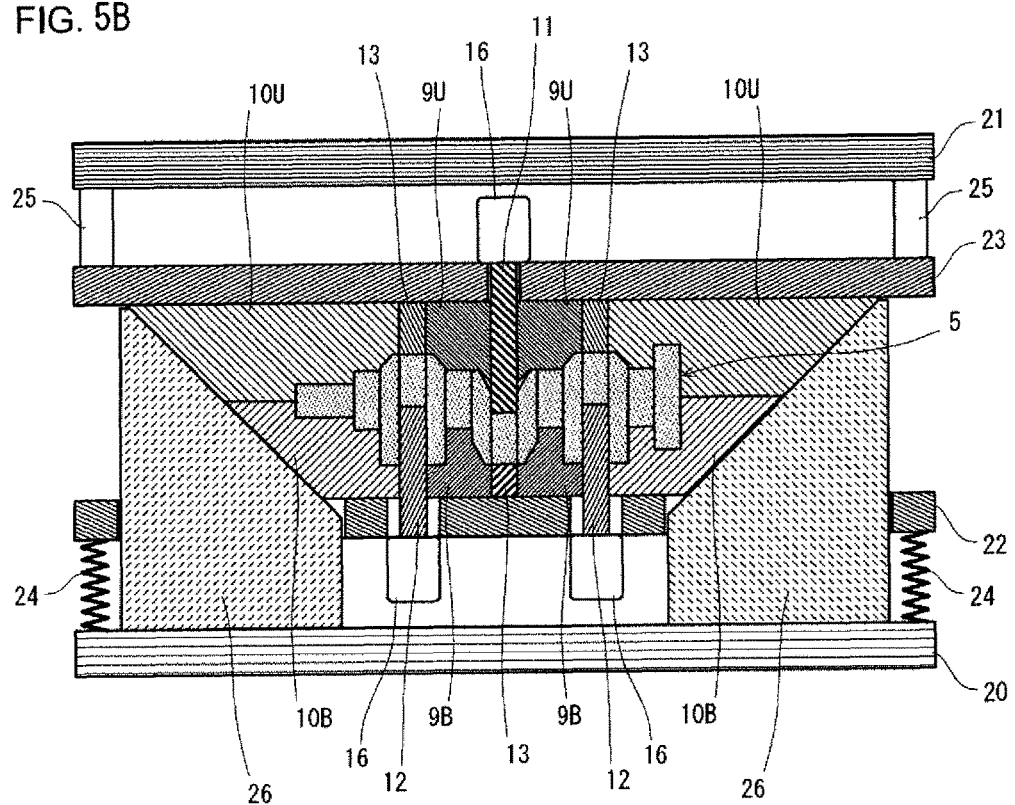

FIG. 8
PREFORM BLANK
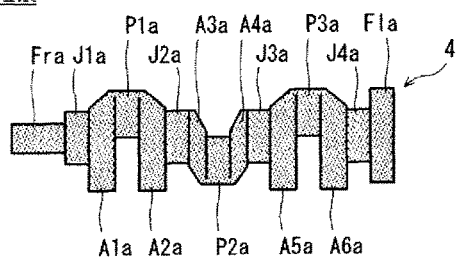
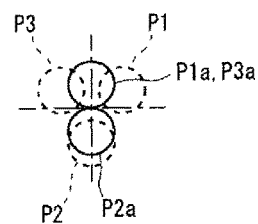
↓ FORMING
(SECOND PREFORMING)
BLANK FOR FINISH FORGING
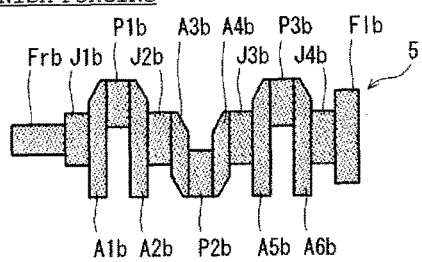
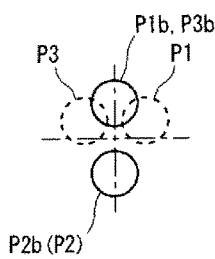
↓ FINISH FORGING
FORGED PRODUCT
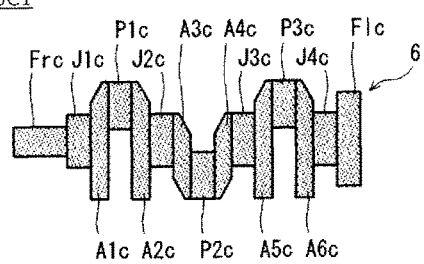
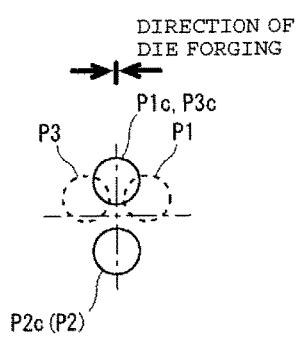
↓ TWISTING
TWISTED PRODUCT
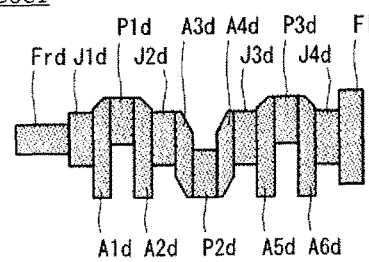
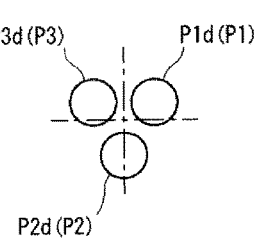

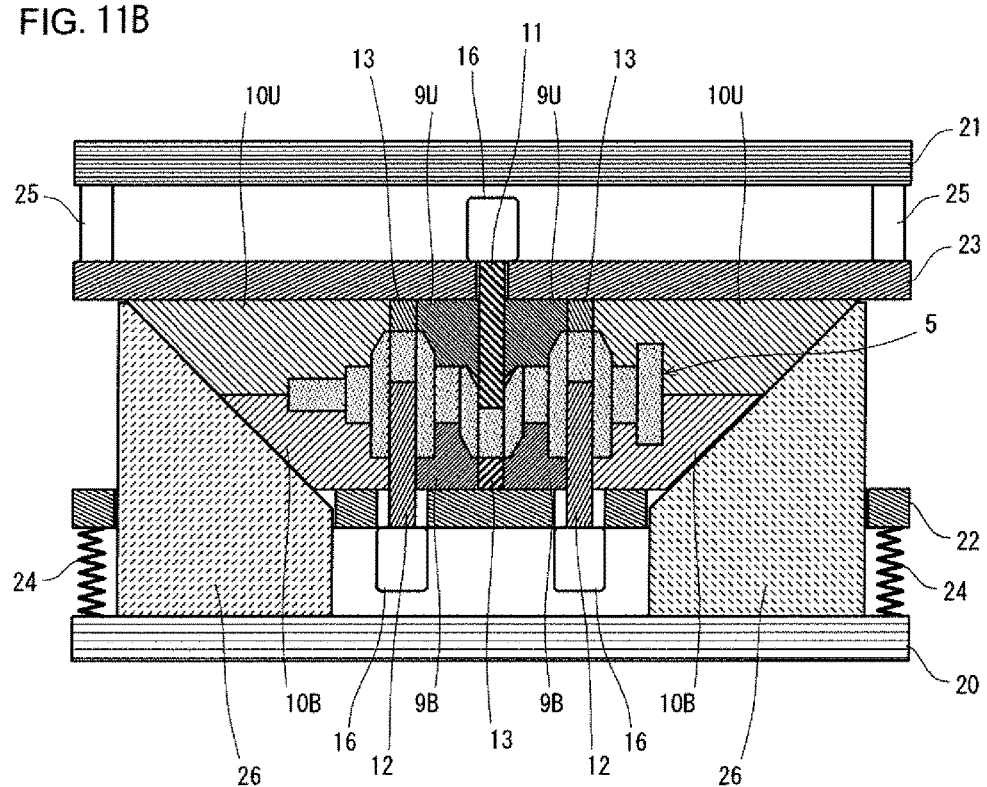

FIG. 12
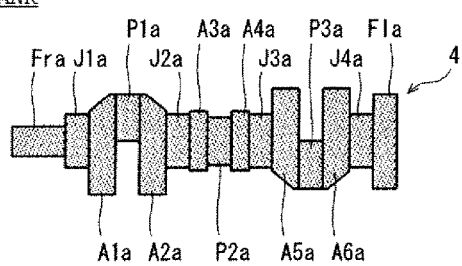
PREFORM BLANK
⇩ FORMING (SECOND PREFORMING)
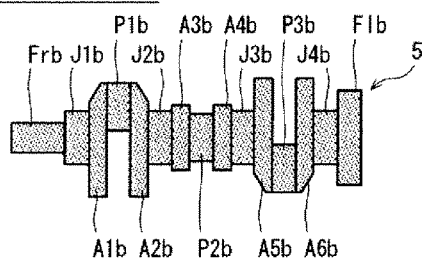
BLANK FOR FINISH FORGING
⇩ FINISH FORGING
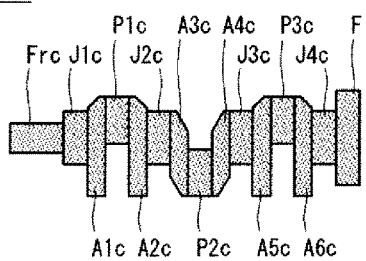
FORGED PRODUCT FIG. 16
PREFORM BLANK
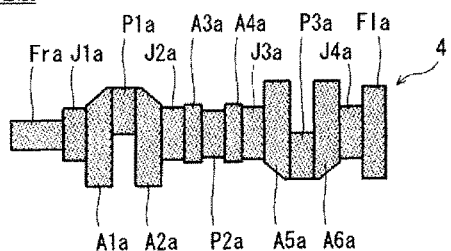
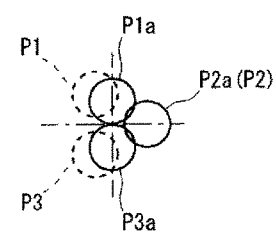
⇩ FORMING
(SECOND PREFORMING)
BLANK FOR FINISH FORGING
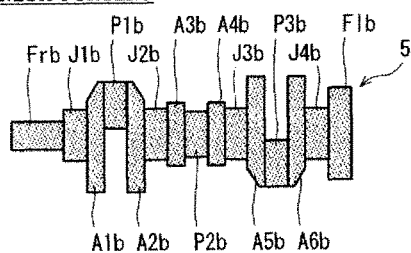
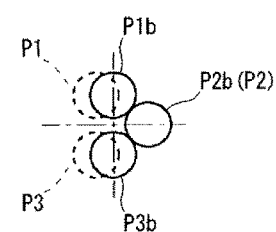
⇩ FINISH FORGING
FORGED PRODUCT
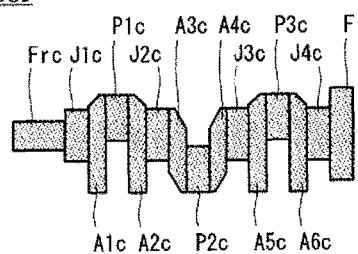
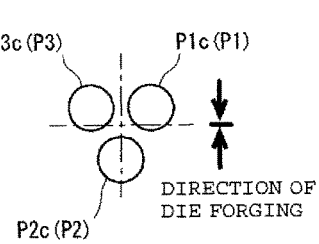
DIRECTION OF DIE FORGING

APPARATUS FOR FORMING A BLANK FOR FINISH FORGING FOR A FORGED CRANKSHAFT FOR A THREE-CYLINDER ENGINE AND METHOD FOR MANUFACTURING A FORGED CRANKSHAFT FOR A THREE-CYLINDER ENGINE USING THE SAME

TECHNICAL FIELD

The present invention relates to techniques for manufacturing, by hot forging, a crankshaft (hereinafter also referred to as a "forged crankshaft") for a three-cylinder engine. In particular, the present invention relates to an apparatus for forming, in the process of manufacturing a forged crankshaft, a blank for finish forging to be subjected to finish forging by which a final shape of the forged crankshaft is obtained, and a method for manufacturing a forged crankshaft for a three-cylinder engine including preforming steps using such forming apparatus.

BACKGROUND ART

In engines of passenger cars, motorcycles, agricultural machines, and the like, a crankshaft is required for taking out power by converting reciprocating motion of pistons to rotary motion. Generally, there are two types of crankshafts: those that are manufactured by forging and those that are manufactured by casting, and the former forged crankshafts superior in terms of strength and stiffness are more widely used. In recent years, in order to improve fuel economy performance and meet emission regulations, downsizing of engine displacement becomes popular, and a three-cylinder engine is attracting wide attention.

In general, forged crankshafts for three-cylinder engines are manufactured by using, as a starting material, a billet having a circular or square cross section and having a constant cross-sectional area along the entire length, and subjecting the billet to the steps of preforming, die forging, trimming and coining in order. The preforming step includes roll forming and bending, and the die forging step includes block forging and finish forging.

FIG. 1 is a schematic diagram illustrating a typical conventional process for manufacturing a forged crankshaft for a three-cylinder engine. A crankshaft 1 illustrated in FIG. 1 is to be mounted in a three-cylinder engine. It is a three-cylinder four-counterweight crankshaft that includes: four journals J1 to J4; three crank pins P1 to P3; a front part Fr; a flange Fl; and six crank arms (hereinafter referred to as "arms" to be simple) A1 to A6 that alternatively connect the journals J1 to J4 and the crank pins P1 to P3 to each other, wherein among the six arms A1 to A6, first and second arms A1 and A2, and fifth and sixth arms A5 and A6 respectively connecting to first and third crank pins P1 and P3 at opposite ends, have balance weights. The third and fourth arms A3 and A4 connecting with the second crank pin P2 in the center have no balance weight, therefore having oval shapes. Hereinafter, when the journals J1 to 14, the crank pins P1 to P3, and the arms A1 to A6 are each collectively referred to, a reference character "J" is used for the journals, a reference character "P" for the crank pins, and a reference character "A" for the arms. An arm having a balance weight is also referred to as a weighted arm when distinguished from an arm having no balance weight. On the other hand, an arm having no balance weight is also referred to as a non-weighted arm or an oval arm.

According to the manufacturing method shown in FIG. 1, the forged crankshaft 1 is manufactured in the following manner. Firstly, a billet 2 shown in FIG. 1(a), which has been previously cut to a predetermined length, is heated by a furnace and then is subjected to roll forming. In the roll forming step, the billet 2 is rolled and reduced in cross section by grooved rolls, for example, to distribute its volume in the longitudinal direction, whereby a rolled blank 103, which is an intermediate material, is formed (see FIG. 1(b)). In the bending step, the rolled blank 103 obtained by the roll forming is partially pressed in a press in a direction perpendicular to the longitudinal direction to distribute its volume, whereby a bent blank 104, which is a secondary intermediate material, is formed (see FIG. 1(c)).

Then, in the block forging step, the bent blank 104 obtained by bending is press forged with a pair of upper and lower dies, whereby a forged blank 105 having a general shape of a crankshaft (forged final product) is formed (see FIG. 1(d)). Then, in the finish forging step, the block forged blank 105 obtained by the block forging is further processed by press forging the block forged blank 105 with a pair of upper and lower dies, whereby a forged blank 106 having a shape in agreement with the shape of the crankshaft is formed (see FIG. 1(e)). In the block forging and the finish forging, excess material flows out as a flash from between the parting surfaces of the dies that oppose each other. Thus, the block forged blank 105 and the finish forged blank 106 have large flashes 105a and 106a, respectively, around the formed shape of the crankshaft.

In the trimming step, the finish forged blank 106 with the flash 106a, obtained by the finish forging, is held by dies from above and below and the flash 106a is trimmed by a cutting die. In this manner, the forged crankshaft 1 is obtained as shown in FIG. 1(f). In the coining step, principal parts of the forged crankshaft 1, from which the flash has been removed, e.g., shaft parts such as the journals J, the crank pins P, the front part Fr, and the flange Fl, and in some cases the arms A, are slightly pressed with dies from above and below and formed into a desired size and shape. Finally, the forged crankshaft 1 is manufactured.

It should be noted that, when adjustment of a placement angle of the crank pins is necessary, a step of twisting is added after the trimming step.

With such a manufacturing method, however, it is inevitable that material utilization decreases since large amounts of unnecessary flash, which is not a part of the end product, are generated. Thus, in the manufacturing of a forged crankshaft, it has been so far an important object to inhibit the generation of flash to the extent possible and achieve improvement of material utilization. Examples of conventional techniques that address this object are as follows.

For example, Japanese Patent Application Publication No. 2008-155275 (Patent Literature 1) and Japanese Patent Application Publication No. 2011-161496 (Patent Literature 2) disclosure techniques for manufacturing a crankshaft, by which journals and crank pins are shaped and crank arms are roughly shaped. In the technique of Patent Literature 1, a stepped round bar having reduced diameter regions at portions to be formed into journals and crank pins of a crankshaft is a round bar used as a blank. Then, a pair of portions to be formed into journals, between which a portion to be formed into a crank pin is disposed, are held with dies. In this state, opposing dies are axially moved toward each other to compressively deform a round bar blank. Concurrently with imparting this deformation, punches are pressed against the portion to be formed into a crank pin in a direction perpendicular to the axial direction, whereby the portion to be formed into a crank pin is placed into an eccentric position. This operation is repeated in succession for all crank throws.

In the technique of Patent Literature 2, a simple round bar is used as a blank. One end of the two ends of the round bar is held with a stationary die and the other end thereof with a movable die, and portions to be formed into journals are held with journal dies and portions to be formed into crank pins with crank pin dies. In this state, the movable die, the journal dies, and the crank pin dies are axially moved toward the stationary die to compressively deform the round bar blank. Concurrently with imparting this deformation, the crank pin dies are moved in an eccentric direction perpendicular to the axial direction to place the portion to be formed into the crank pin into an eccentric position.

With both the techniques disclosed in Patent Literatures 1 and 2, no flash will be generated, and therefore a significant improvement in material utilization can be expected.

CITATION LIST

Patent Literature

Patent Literature 1: Japanese Patent Application Publication No. 2008-155275
Patent Literature 2: Japanese Patent Application Publication No. 2011-161496

SUMMARY OF INVENTION

Technical Problem

As described above, according to the techniques disclosed in Patent Literatures 1 and 2, a round bar blank is directly processed into a crankshaft shape. However, forged crankshafts are required to have high strength and high stiffness, thus blanks for the forged crankshaft are not easily deformable. As such, crankshafts that would be practically manufacturable are inevitably limited to the ones having arms of large thickness and crank pins with a small amount of eccentricity, and therefore having a relatively gentle crankshaft shape. Moreover, all the crank arms are limited to a simple shape without a balance weight, that is, an oval arm.

In addition, according to the techniques disclosed in Patent Literatures 1 and 2, the shape of arms is formed by free expansion of a round bar blank in a direction perpendicular to the axial direction in conjunction with its axial compressive deformation and by tensile deformation of the round bar blank in conjunction with the movement of portions to be formed into crank pins in an eccentric direction. Because of this, the contour shape of the arms tends to be unstable, and thus dimensional accuracy cannot be ensured.

The present invention has been made in view of the above-mentioned problems. Accordingly, in order to manufacture forged crankshafts for three-cylinder engines with high material utilization and also with high dimensional accuracy regardless of their shapes, it is an object of the present invention to provide an apparatus for use in forming a blank for finish forging to be subjected to finish forging on the premise that, in the process of manufacturing the forged crankshaft, finish forging for forming its final shape is performed. Further, it is another object of the present invention to provide a method for manufacturing forged crankshafts for three-cylinder engines with high material utilization and also with high dimensional accuracy regardless of their shapes.

Solution to Problem

A forming apparatus according to embodiments of the present invention is an apparatus for forming, from a preform blank, in the process of manufacturing the forged crankshaft for a three-cylinder engine, the blank for finish forging to be subjected to finish forging by which a final shape of the forged crankshaft is formed.

In the forged crankshaft, third and fourth crank arms connecting with a second crank pin in a center have no balance weights, and remaining crank arms have balance weights.

The preform blank includes:
rough journal portions having an axial length equal to an axial length of journals of the forged crankshaft;
rough crank pin portions having an axial length equal to an axial length of crank pins of the forged crankshaft;
third and fourth rough crank arm portions corresponding to the third and fourth crank arms of the forged crankshaft, having an axial thickness equal to an axial thickness of such crank arms; and
weighted rough crank arm portions corresponding to weighted crank arms having the balance weights of the forged crankshaft, having an axial thickness greater than an axial thickness of such crank arms.

The apparatus for forming a blank for finish forging a forged crankshaft for a three-cylinder engine according to the present embodiment further has the following structures (1) or (2).

(1) The rough crank pin portions in the preform blank have a smaller amount of eccentricity in the direction perpendicular to the axial direction than an amount of eccentricity of the crank pins of the forged crankshaft.

The forming apparatus includes a reference crank pin die, movable crank pin dies, and stationary and movable journal dies, described below.

The reference crank pin die is disposed at a location of a second rough crank pin portion, configured to be brought into contact with the second rough crank pin portion, and configured to move in the direction perpendicular to the axial direction, but be constrained from moving in the axial direction, while being in contact with side surfaces of a third and a fourth rough crank arm portions through which the rough crank arm portions connect with the second rough crank pin portion.

The movable crank pin dies are disposed at locations of the corresponding first and third rough crank pin portions at opposite ends, configured to be brought into contact with the first and third rough crank pin portions, and configured to move axially toward the reference crank pin die and in the direction perpendicular to the axial direction, while being in contact with side surfaces of the rough crank arm portions through which the rough crank arm portions connect with the first and third rough crank pin portions.

The stationary journal dies are disposed at locations of the rough journal portions connecting with the third and fourth rough crank arm portions, configured to hold and retain such rough journal portions therebetween in the direction perpendicular to the axial direction, and configured to be constrained from moving axially while being in contact with side surfaces of the third and fourth rough crank arm portions.

The movable journal dies are disposed at locations of the corresponding rough journal portion excluding the rough journal portions connecting with the third and fourth rough crank arm portions, configured to hold and retain such rough journal portions therebetween in the direction perpendicular to the axial direction, and configured to move axially toward the reference crank pin die while being in contact with side surfaces of the rough crank arm portions through which the rough crank arm portions connect with such rough journal portions.

The forming apparatus is configured such that in a state that the rough journal portions are held and retained by the stationary and movable journal dies and the rough crank pin portions are contacted with the reference crank pin die and the movable crank pin dies, the movable journal dies are moved axially, the movable crank pin dies are moved axially and in the direction perpendicular to the axial direction, and the reference crank pin die is moved in the direction perpendicular to the axial direction, thereby compressing the weighted rough crank arm portions in the axial direction so as to reduce the thickness thereof to the thickness of weighted crank arms of the forged crankshaft, and pressing the rough crank pin portions in the direction perpendicular to the axial direction so as to increase the amount of eccentricity thereof to the amount of eccentricity of the crank pins of the forged crankshaft.

In the above forming apparatus in (1), it is preferred that the reference crank pin die and the movable crank pin dies each includes an auxiliary crank pin die disposed at a location outside of the corresponding rough crank pin portion, opposite to the side where the reference crank pin die and the movable crank pin dies are contacted, and in conjunction with the axial movement of the movable journal dies as well as that of the movable crank pin dies and the auxiliary crank pin dies forming pairs therewith, a movement of the movable crank pin dies in the direction perpendicular to the axial direction is controlled in a manner that the rough crank pin portions to be deformed by pressing reach to the auxiliary crank pin dies after spaces between the movable journal dies, the reference crank pin die, the movable crank pin dies, and the auxiliary crank pin dies are filled.

This forming apparatus preferably has a configuration such that, provided that a total length of movement of the movable crank pin dies in the direction perpendicular to the axial direction is a 100% length of movement thereof, when the axial movement of the movable journal dies that are adjacent to such movable crank pin dies is completed, a length of movement of such movable crank pin dies in the direction perpendicular to the axial direction is 90% or less of the total length of movement, and thereafter, the movement of such movable crank pin dies in the direction perpendicular to the axial direction is completed.

Further, the above forming apparatus in (1) may have a configuration such that the reference crank pin die, the movable crank pin dies, and the stationary and movable journal dies are mounted on a press machine that is capable of being moved downward along the direction perpendicular to the axial direction and, by the downward movement of the press machine, the stationary and movable journal dies are caused to hold and retain the rough journal portions therebetween while the reference crank pin die and the movable crank pin dies are brought into contact with the rough crank pin portions, and with continued downward movement of the press machine, the movable journal dies are moved axially by wedge mechanisms, and the movable crank pin dies are caused to move axially by the movement of the movable journal dies.

In case of this forming apparatus, it is preferred that the wedge mechanisms have different wedge angles for each movable journal die. Furthermore, it is preferred that the reference crank pin die and the movable crank pin dies are coupled to hydraulic cylinders and caused to move in the direction perpendicular to the axial direction by driving the hydraulic cylinders.

(2) First and third rough crank pin portions at opposite ends in the preform blank have an amount of eccentricity in a direction perpendicular to an axial direction in the opposite direction to each other, the amount of eccentricity thereof being less than a $\sqrt{3}/2$ of an amount of eccentricity of the crank pins of the forged crankshaft, and a second rough crank pin portion in the center in a preform blank has an amount of eccentricity in the direction perpendicular to the axial direction of zero or has the same amount of eccentricity in a direction perpendicular to an eccentric direction of the first and third rough crank pin portions as an amount of eccentricity of the crank pin of the forged crankshaft.

The forming apparatus includes a reference crank pin die, movable crank pin dies, and journal dies, described below.

The reference crank pin die is disposed at a location of the second rough crank pin portion, configured to be brought into contact with the second rough crank pin portion, and configured to be constrained from moving in the axial direction while, being in contact with side surfaces of the third and fourth rough crank arm portions through which the rough crank arm portions connect with the second rough crank pin portion.

The movable crank pin dies are disposed at locations of the corresponding first and third rough crank pin portions, configured to be brought into contact with the first and third rough crank pin portions, and configured to move axially toward the reference crank pin die and in the direction perpendicular to the axial direction, while being in contact with side surfaces of the rough crank arm portions through which the rough crank arm portions connect with the first and third rough crank pin portions.

The stationary journal dies are disposed at locations of the rough journal portions connecting with the third and fourth rough crank arm portions, configured to hold and retain such rough journal portions therebetween in the direction perpendicular to the axial direction, and configured to be constrained from moving axially while being in contact with side surfaces of the third and fourth rough crank arm portions.

The movable journal dies are disposed at locations of the corresponding rough journal portion excluding the rough journal portions connecting with the third and fourth rough journal portions, configured to hold and retain such rough journal portions therebetween in the direction perpendicular to the axial direction, and configured to move axially toward the reference crank pin die while being in contact with side surfaces of the rough crank arm portions through which the rough crank arm portions connect with such rough journal portions.

The forming apparatus in a state that the rough journal portions are held and retained by the stationary and movable journal dies and the rough crank pin portions are contacted with the reference crank pin die and the movable crank pin dies, the movable journal dies are moved axially and the movable crank pin dies are moved axially and in the direction perpendicular to the axial direction, thereby compressing the weighted rough crank arm portions in the axial direction so as to reduce the thickness thereof to the thickness of weighted crank arms of a forged crankshaft, and pressing the first and third rough crank pin portions in the direction perpendicular to the axial direction, but in the opposite direction to each other, so as to increase the amount of eccentricity thereof to the $\sqrt{3}/2$ of the amount of eccentricity of crank pins of the forged crankshaft.

The manufacturing method according to embodiments of the present invention is a method for manufacturing a forged crankshaft for a three-cylinder engine, and includes any one of configurations (3) to (6) described below.

(3) A method for manufacturing includes the following successive steps comprising a first preforming step, a second preforming step, and a finish forging step.

The first preforming step forms a preform blank to be supplied to the above forming apparatus in (1). First and third rough crank pin portions at opposite ends in a preform blank have an amount of eccentricity in a direction perpendicular to an axial direction in the opposite direction to each other, the amount of eccentricity thereof being equal to a $\sqrt{3}/2$ of an amount of eccentricity of crank pins of the forged crankshaft. A second rough crank pin portion in the center in a preform blank has a smaller amount of eccentricity in the direction perpendicular to the axial direction in the direction perpendicular to an eccentric direction of the first and third rough crank pin portions than an amount of eccentricity of the crank pin of the forged crankshaft.

The second preforming step forms, using the above forming apparatus described in (1), a blank for finish forging. The blank for finish forging has the final shape of the forged crankshaft including the placement angle of the crank pins.

In the finish forging step, finish forging is performed on the blank for finish forging to form a forged product having the final shape of the forged crankshaft including the placement angle of the crank pins.

(4) A method for manufacturing includes the following successive steps comprising a first preforming step, a second preforming step, a finish forging step, and a twisting step.

The first preforming step forms a preform blank to be supplied to the above forming apparatus in (1). First and third rough crank pin portions at opposite ends in a preform blank have a smaller amount of eccentricity in a direction perpendicular to an axial direction in the same direction than an amount of eccentricity of crank pins of the forged crankshaft. A second rough crank pin portion in the center in a preform blank has a smaller amount of eccentricity in the direction perpendicular to the axial direction in the direction opposite to an eccentric direction of the first and third rough crank pin portions than an amount of eccentricity of the crank pin of the forged crankshaft.

The second preforming step forms a blank for finish forging using the above forming apparatus described in (1). The blank for finish forging has the final shape of the forged crankshaft excluding the placement angle of the crank pins.

In the finish forging step, finish forging is performed on the blank for finish forging to form a forged product having the final shape of the forged crankshaft excluding the placement angle of the crank pins.

In the twisting step, the placement angle of the crank pins of the forged product is adjusted to the placement angle of the crank pins of the forged crankshaft.

(5) A method for manufacturing includes the following successive steps comprising a first preforming step, a second preforming step, and a finish forging step.

The first preforming step forms a preform blank to be supplied to the above forming apparatus in (2). First and third rough crank pin portions at opposite ends in a preform blank have an amount of eccentricity in a direction perpendicular to an axial direction in the opposite direction to each other, the amount of eccentricity thereof being less than a $\sqrt{3}/2$ of an amount of eccentricity of the crank pins of the forged crankshaft. A second rough crank pin portion in the center in a preform blank has an amount of eccentricity in the direction perpendicular to the axial direction of zero.

The second preforming step forms, using the above forming apparatus described in (2), a blank for finish forging. The first and third rough crank pin portions at opposite ends in a blank for finish forging have an amount of eccentricity in the direction perpendicular to the axial direction in the opposite direction to each other, the amount of eccentricity thereof being equal to the $\sqrt{3}/2$ of the amount of eccentricity of the crank pins of the forged crankshaft. The second rough crank pin portion in the center in a blank for finish forging remains the same amount of eccentricity in the direction perpendicular to the axial direction as the preform blank.

In the finish forging step, finish forging is performed on the blank for finish forging in a state that the first and third rough crank pin portions at opposite ends are horizontally placed, whereby all the rough crank pin portions are pressed in the direction perpendicular to the axial direction to form a forged product having a final shape of the forged crankshaft including the placement angle of the crank pins.

(6) A method for manufacturing includes the following successive steps comprising a first preforming step, a second preforming step, and a finish forging step.

The first preforming step forms a preform blank to be supplied to the above forming apparatus in (2). First and third rough crank pin portions at opposite ends in a preform blank have an amount of eccentricity in a direction perpendicular to an axial direction in the opposite direction to each other, the amount of eccentricity thereof being less than a $\sqrt{3}/2$ of an amount of eccentricity of the crank pins of the forged crankshaft. A second rough crank pin portion in the center in a preform blank has an amount of eccentricity in the direction perpendicular to the axial direction in the direction perpendicular to an eccentric direction of the first and third rough crank pin portions, the amount of eccentricity thereof being the same as an amount of eccentricity of the crank pin of the forged crankshaft.

The second preforming step forms a blank for finish forging using the above forming apparatus described in (2). The first and third rough crank pin portions at opposite ends in a blank for finish forging have an amount of eccentricity in the direction perpendicular to the axial direction in the opposite direction to each other, the amount of eccentricity thereof being equal to the $\sqrt{3}/2$ of the amount of eccentricity of the crank pins of the forged crankshaft. The second rough crank pin portion in the center in a blank for finish forging remains the same amount of eccentricity in the direction perpendicular to the axial direction as the preform blank.

In the finish forging step, finish forging is performed on the blank for finish forging in a state that the first and third rough crank pin portions at opposite ends are horizontally placed, whereby the first and third rough crank pin portions are pressed in the direction perpendicular to the axial direction to form a forged product having a final shape of the forged crankshaft including the placement angle of the crank pins.

Advantageous Effects of Invention

With the forming apparatus of the present embodiment and the manufacturing method including the preforming steps in which such apparatus is used, it is possible to form, from a preform blank without a flash, a blank for finish forging without a flash which has a shape generally in agreement with a shape of a forged crankshaft for a three-cylinder engine having thin arms, even with the weighted arms. By subjecting such a blank for finish forging without a flash to finish forging, it is possible to obtain the final shape of the forged crankshaft including the contour shape of crank arms although some minor amount of flash is generated. Thus, forged crankshafts for three-cylinder engines can be manufactured with high material utilization and also with high dimensional accuracy regardless of their shapes.

BRIEF DESCRIPTION OF DRAWINGS

FIG. 4 is a longitudinal sectional view showing a configuration of the forming apparatus according to the first embodiment.

FIG. 5B is a longitudinal sectional view illustrating a process for forming a blank for finish forging using the forming apparatus according to the first embodiment shown in FIG. 4, with a forming state at the completion shown therein.

FIG. 8 is a diagram schematically showing the shapes of a preform blank to be processed by the forming apparatus, a blank for finish forging formed therefrom, a forged product after finish forging, and a twisted product after twisting, in the manufacturing method of a second embodiment.

FIG. 11B is a longitudinal sectional view illustrating a process for forming a blank for finish forging using the forming apparatus according to the second embodiment shown in FIG. 10, with a forming state at the completion shown therein.

FIG. 12 is a diagram schematically showing the shapes of a preform blank to be processed by the forming apparatus, a blank for finish forging formed therefrom, and a forged product after finish forging, in the manufacturing method of a third embodiment.

FIG. 16 is a diagram schematically showing the shapes of a preform blank to be processed by the forming apparatus, a blank for finish forging formed therefrom, and a forged product after finish forging, in the manufacturing method of a fourth embodiment.

DESCRIPTION OF EMBODIMENTS

The present invention is based on the premise that, in manufacturing a forged crankshaft for a three-cylinder engine, finish forging is performed in the manufacturing process. The forming apparatus of the present invention is used for forming, in a step prior to finish forging, a blank for finish forging to be subjected to the finish forging, from a preform blank. With regard to the apparatus for forming a blank for finish forging for a forged crankshaft for a three-cylinder engine and the method for manufacturing a forged crankshaft for a three-cylinder engine including the preforming steps using such apparatus, of the present invention, embodiments thereof are described in detail below.

Figure 2:
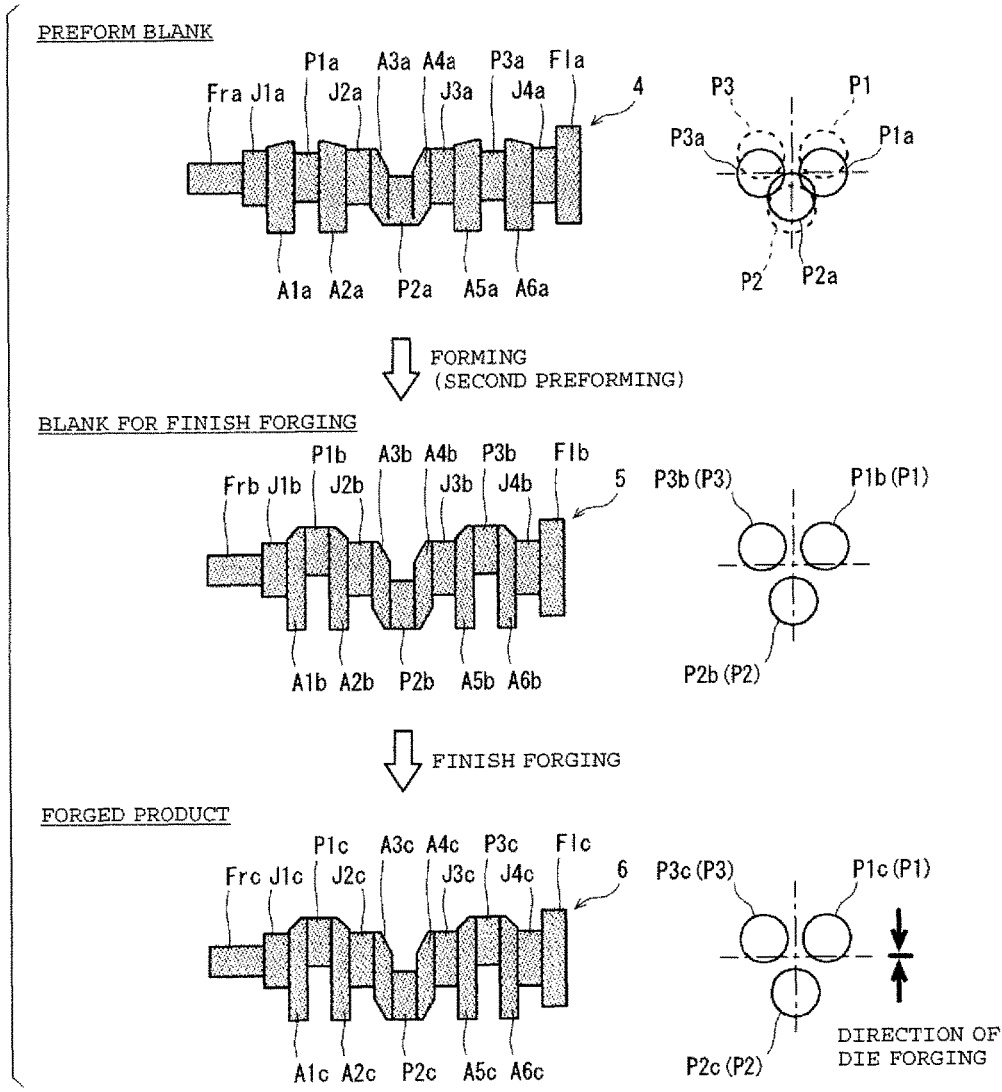
FIG. 2 is a diagram schematically showing the shapes of a preform blank to be processed by the forming apparatus, a blank for finish forging formed therefrom, and a forged product after finish forging, in the manufacturing method of a first embodiment.

1. First Embodiment 1-1. Preform Blank, Blank for Finish Forging, and Forged Product FIG. 2 is a diagram schematically showing the shapes of a preform blank to be processed by the forming apparatus, a blank for finish forging formed therefrom, and a forged product after finish forging, in the manufacturing method of the first embodiment. FIG. 2 shows how a three-cylinder four-counterweight crankshaft is manufactured as an example. In addition, FIG. 2 shows plane views showing an outside appearance of the crankshaft and drawings depicting an arrangement of crank pins with a view along an axial direction side by side to facilitate understanding of the shapes of the blanks in each step.

Figure 1:
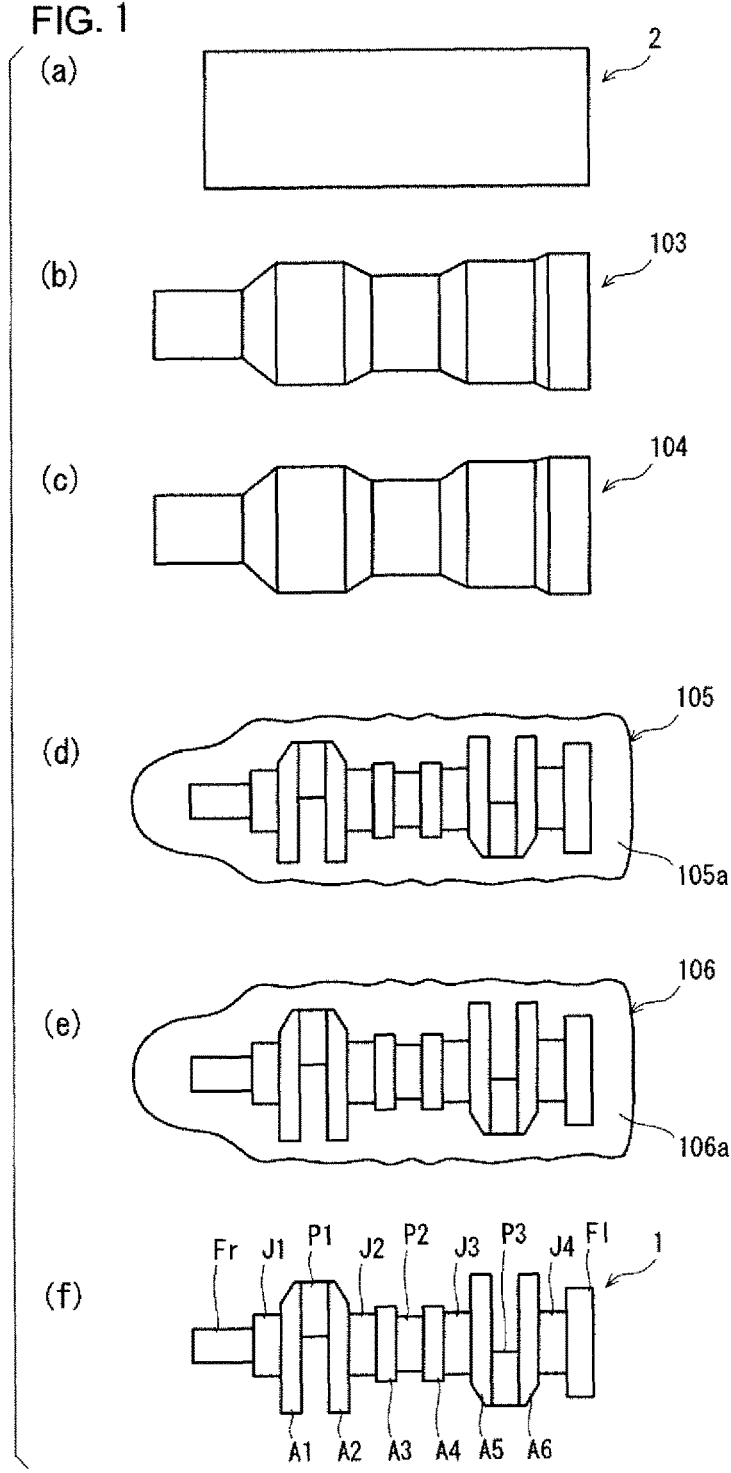
FIG. 1 is a schematic diagram illustrating a typical conventional process for manufacturing a forged crankshaft for a three-cylinder engine.

As shown in FIG. 2, a preform blank 4 of the first embodiment has a crankshaft shape that is approximate to a shape of a forged crankshaft 1 for a three-cylinder four-counterweight shown in FIG. 1 (*f*) but is generally in a rough shape. The preform blank 4 includes: four rough journal portions J1*a* to J4*a*; three rough crank pin portions P1*a* to P3*a*; a rough front part portion Fra; a rough flange portion Fla; and six rough crank arm portions A1*a* to A6*a* (hereinafter also referred to simply as "rough arm portions") that alternatively connect the rough journal portions J1*a* to J4*a*, and the rough crank pin portions P1*a* to P3*a* to each other. The third and fourth rough arm portions A3*a* and A4*a* connecting with the second rough crank pin portion P2*a* in the center have no balance weight, therefore having oval shapes. The preform blank 4 has no flash. Hereinafter, when the rough journal portions J1a to J4a, the rough crank pin portions P1a to P3a, and the rough arm portions A1a to A6a, of the preform blank 4, are each collectively referred to, a reference character "Ja" is used for the rough journal portions, a reference character "Pa" for the rough crank pin portions, and a reference character "Aa" for the rough arm portions. The first, second, fifth, and sixth rough arm portions A1a, A2a, A5a, and A6a having balance weights are also referred to as weighted rough arm portions Aa. On the other hand, the third and fourth rough arm portions A3a and A4a having no balance weight are also referred to as non-weighted rough arm portions Aa, or oval rough arm portions Aa.

A blank for finish forging 5 of the first embodiment is formed from the preform blank 4 described above using a forming apparatus, details of which will be provided later. The blank for finish forging 5 includes four rough journal portions J1b to J4b, three rough crank pin portions P1b to P3b, a rough front part portion Frb, a rough flange portion Flb, and six rough crank arm portions A1b to A6b (hereinafter also referred to simply as "rough arm portions") that alternatively connect the rough journal portions J1b to J4b, and the rough crank pin portions P1b to P3b to each other. The third and fourth rough arm portions A3b and A4b connecting with the second rough crank pin portion P2b in the center have no balance weight, therefore having oval shapes. The blank for finish forging 5 has no flash. Hereinafter, when the rough journal portions J1b to J4b, the rough crank pin portions P1b to P3b, and the rough arm portions A1b to A6b, of the blank for finish forging 5, are each collectively referred to, a reference character "Jb" is used for the rough journal portions, a reference character "Pb" for the rough crank pin portions, and a reference character "Ab" for the rough arm portions. The first, second, fifth, and sixth rough arm portions A1b, A2b, A5b, and A6b having balance weights are also referred to as weighted rough arm portions Ab. On the other hand, the third and fourth rough arm portions A3b and A4b having no balance weight are also referred to as non-weighted rough arm portions Ab, or oval rough arm portions Ab.

A forged product 6 of the first embodiment is obtained from the blank for finish forging 5 described above by finish forging. The forged product 6 includes four journals J1c to J4c, three crank pins P1c to P3c, a front part Frc, a flange Flc, and six crank arms A1c to A6c (hereinafter also referred to simply as "arms") that alternatively connect the journals J1c to J4c, and the crank pins P1c to P3c to each other. The third and fourth arms A3c and A4c connecting with the second rough crank pin portion P2c in the center have no balance weight, therefore having oval shapes. Hereinafter, when the journals J1c to J4c, the crank pins P1c to P3c, and the arms A1c to A6c, of the forged product 6, are each collectively referred to, a reference character "Jc" is used for the journals, a reference character "Pc" for the crank pins, and a reference character "Ac" for the arms. The first, second, fifth, and sixth arms A1c, A2c, A5c, and A6c having balance weights are also referred to as weighted arms Ac. On the other hand, the third and fourth arms A3c and A4c having no balance weight are also referred to as non-weighted arms Ac, or oval arms Ac.

The forged product 6 has a shape that is in agreement with a shape of a crankshaft (forged final product) including a placement angle of the crank pins Pc and corresponds to a forged crankshaft 1 shown in FIG. 1(f). Specifically, the journals Jc of the forged product 6 have an axial length equal to that of journals J of the forged crankshaft having the final shape. The crank pins Pc of the forged product 6 have an axial length equal to that of crank pins P of the forged crankshaft having the final shape. Further, the crank pins Pc of the forged product 6 have the same amount of eccentricity in a direction perpendicular to an axial direction and the same placement angle of 120° as the crank pins P of the forged crankshaft having the final shape, thus they are placed at the specified positions. The arms Ac of the forged product 6 have an axial thickness equal to that of arms A of the forged crankshaft having the final shape.

The blank for finish forging 5 has a shape that is generally in agreement with the shape of the forged product 6 and corresponds exactly to a block forged blank 105 shown in FIG. 1(d) with a difference therebetween being a flash 105a. Specifically, the rough journal portions Jb of the blank for finish forging 5 have an axial length equal to that of the journals J of the forged crankshaft having the final shape (journals Jc of forged product 6). The rough crank pin portions Pb of the blank for finish forging 5 have an axial length equal to that of the crank pins P of the forged crankshaft having the final shape (crank pins Pc of forged product 6). Further, the crank pins Pb of the blank for finish forging 5 have the same amount of eccentricity in the direction perpendicular to the axial direction and the same placement angle of 120° as the crank pins P of the forged crankshaft having the final shape, thus they are placed at the specified positions. The rough arm portions Ab of the blank for finish forging 5 have an axial thickness equal to that of the arms A of the forged crankshaft having the final shape (arms Ac of forged product 6).

In contrast, the rough journal portions Ja of the preform blank 4 have an axial length equal to that of the rough journal portions Jb of the blank for finish forging 5, i.e., that of the journals J of the forged crankshaft (journals Jc of forged product 6). The rough crank pin portions Pa of the preform blank 4 have an axial length equal to that of the rough crank pin portions Pb of the blank for finish forging 5, i.e., that of the crank pins P of the forged crankshaft (crank pins Pc of forged product 6), but have a smaller amount of eccentricity than that of the rough crank pin portions Pb of the blank for finish forging 5. Specifically, the first and third rough crank pin portions P1a and P3a at opposite ends among the rough crank pin portions Pa of the preform blank 4 have an amount of eccentricity in the opposite direction to each other, the amount of eccentricity thereof being equal to a √3/2 of an amount of eccentricity in the crank pins P of the forged crankshaft. On the other hand, the second rough crank pin portion P2a in the center is configured to have an amount of eccentricity in the direction perpendicular to an eccentric direction of the first and third rough crank pin portions P1a and P3a, the amount of eccentricity thereof being approximately equal to a half of an amount of eccentricity in the crank pin P of the forged crankshaft.

Among the rough arm portions Aa of the preform blank 4, the weighted rough arm portions Aa (the first, second, fifth and sixth rough arm portions A1a, A2a, A5a, and A6a) have an axial thickness greater than that of the respective weighted rough arm portions Ab of the blank for finish forging 5, i.e., weighted arms A of the forged crankshaft (the weighted arms Ac of the forged product 6). On the other hand, the oval rough arm portions Aa of the preform blank 4 (the third and fourth rough arm portions A3a and A4a) have an axial thickness equal to that of the respective oval rough arm portions Ab of the blank for finish forging 5, i.e., the oval arms A (the oval arm Ac of the forged product 6) of the forged crankshaft. In brief, compared to the blank for finish forging 5 (the forged crankshaft having the final shape and the forged product 6), the preform blank 4 has an overall length that is relatively long by the additional thickness of the weighted rough arm portions Aa, and has a relatively small amount of eccentricity of the rough crank pin portions Pa. Thus, the preform blank 4 has a relatively gentle crankshaft shape.

However, strictly speaking, the blank for finish forging 5 has such a configuration that, with respect to the final shapes of the forged crankshaft and the forged product 6, the rough arm portions Ab are made slightly thinner and therefore the axial lengths of the rough journal portions Jb and the rough crank pin portions Pb are accordingly slightly greater. This is intended to ensure that the blank for finish forging 5 can be easily received by the dies when finish forging is performed and thereby prevent the occurrence of scoring. Correspondingly, the preform blank 4, too, has such a configuration that, with respect to the final shapes of the forged crankshaft and the forged product 6, the axial lengths of the rough journal portions Ja and the rough crank pin portions Pa are accordingly slightly greater.

1-2. Process for Manufacturing Forged Crankshaft

Figure 3:
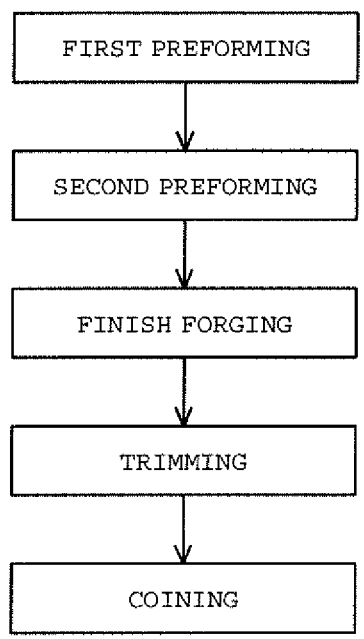
FIG. 3 is a schematic diagram illustrating a process for manufacturing a forged crankshaft according to the first embodiment.

FIG. 3 is a schematic diagram illustrating a process for manufacturing a forged crankshaft according to the first embodiment. As shown in FIG. 3, the process for manufacturing the forged crankshaft for the three-cylinder engine of the first embodiment includes a first preforming step, a second preforming step, and a finish forging step, and also includes a trimming step and a coining step as necessary.

The first preforming step is a step in which the preform blank 4 described above is obtained. In the first preforming step, by using a round billet having a circular cross section as a starting material, a preforming operation is applied to the round billet after it is heated by an induction heater or a gas atmosphere furnace. For example, the round billet is subjected to roll forming in which it is reduction-rolled by grooved rolls to distribute its volume in the longitudinal direction; and the resulting rolled blank is repeatedly subjected to bending in which it is partially pressed in a press from a direction perpendicular to the longitudinal direction to distribute its volume. In this manner, the preform blank 4 can be obtained. Also, the preform blank 4 may be obtained by using the techniques disclosed in Patent Literatures 1 and 2. Furthermore, cross roll forging, fully-enclosed die forging or the like may also be employed.

The second preforming step is a step in which the blank for finish forging 5 described above is obtained. In the second preforming step, operation is applied by using a forming apparatus described in FIG. 4 below. In this manner, the blank for finish forging 5 having the final shape of the forged crankshaft including the placement angle of crank pins can be obtained from the preform blank 4 described above.

The finish forging step is a step in which the forged product 6 described above is obtained. In the finish forging step, the blank for finish forging 5 is supplied to be processed by press forging with a pair of upper and lower dies, whereby the forged product 6 having a shape in agreement with the shape of the crankshaft of the forged crankshaft having the final shape including the placement angle of the crank pins can be obtained.

1-3. Apparatus for Forming Blank for Finish Forging

FIG. 4 is a longitudinal sectional view showing a configuration of the forming apparatus according to the first embodiment. FIG. 4 illustrates, as an example, a forming apparatus that is used in manufacturing a three-cylinder four-counterweight crankshaft, i.e., a forming apparatus configured to form the blank for finish forging 5 from the preform blank 4 shown in FIG. 2. It should be noted that in the longitudinal sectional view shown in FIG. 4, the first and third rough crank pin portions are in reality extended in a front-back direction, where either one of them is located in the front side of the paper and the other one is located in the back side of the paper, however they are illustrated on the same plane for convenience.

As shown in FIG. 4, the forming apparatus is configured to utilize a press machine and includes a stationary lower pressure pad 20 serving as a base and an upper pressure pad 21, which is lowered by driving a ram of the press machine. A lower die holder 22, located over the lower pressure pad 20, is resiliently supported via a resilient member 24. This lower die holder 22 is vertically movable. As the resilient member 24, disc springs, coil springs, air springs, or the like may be employed, or a hydraulic spring system may be employed. An upper die holder 23 is secured under the upper pressure pad 21 via support posts 25. This upper die holder 23 is lowered together with the upper pressure pad 21 by driving the press machine (ram).

In the forming apparatus shown in FIG. 4, the preform blank 4 is placed in the dies in a manner such that the first and third rough crank pin portions P1a and P3a are horizontally positioned and the second rough crank pin portion P2a is positioned in a lower side in the vertical direction. The preform blank 4 placed in such a manner is formed into the blank for finish forging. Thus, vertically forming pairs, i.e., the stationary journal dies 9U and 9B, the movable journal dies 10U and 10B, the reference crank pin die 11 and the auxiliary crank pin die 13, and the movable crank pin dies 12 and the auxiliary crank pin dies 13, are apart from each other in the axial direction of the preform blank 4, and the lower and upper ones are respectively mounted on the lower die holder 22 and the upper die holder 23.

The reference crank pin die 11 and the auxiliary crank pin die 13, vertically forming a pair, are disposed serving as a reference among the rough crank pin portions Pa of the preform blank 4, the location of the second rough crank pin portion P2a in the center, with the upper one mounted on the upper die holder 23 and the lower one mounted on the lower die holder 22. The reference crank pin die 1 of the first embodiment is disposed on the opposite side of a specified position of second rough crank pin portions P2a, whereas its counterpart, the auxiliary crank pin die 13 is disposed in the same side of the specified position of the second rough crank pin portion P2a in the outside. For example, at the location of the second rough crank pin portion P2a, the second rough crank pin portion P2a is positioned in the lower side. Thus the specified position thereof is located in the lower side, as a result, the reference crank pin die 11 is mounted on the upper die holder 23, and its counterpart, the auxiliary crank pin die 13 is mounted on the lower die holder 22.

Particularly, the reference crank pin die 11 and the auxiliary crank pin die 13, i.e., both the upper and lower dies, are constrained from moving in the axial direction on the upper die holder 23 and the lower die holder 22, respectively. Only the reference crank pin die 11 is movable in the direction perpendicular to the axial direction, i.e., the direction toward the specified position of the rough crank pin portion Pa (downward direction in FIG. 4).

The reference crank pin die 11 and the auxiliary crank pin die 13 respectively have impressions 11a and 13a having a semi-cylindrical shape. The length of the impressions 11a and 13a is equal to the axial length of the rough crank pin portion P2b of the blank for finish forging 5.

By the lowering of the upper die holder 23 caused by driving the press machine, i.e., the downward movement of the press machine, the reference crank pin die 11 is brought into a state in which the impression 11a is brought into contact with the second rough crank pin portion P2a. Concurrently, both side surfaces of the reference crank pin die 11 are in contact with the third and fourth rough arm portions A3a and A4a at a second rough crank pin portion P2a-side side surfaces through which the third and fourth rough arm portions A3a and A4a and the second rough crank pin portion P2a are connected.

The movable crank pin dies 12 and the auxiliary crank pin dies 13, vertically forming pairs with each other, are disposed is in contact, the locations of the first and third rough crank pin portions P1a and P3a, with the upper ones mounted on the upper die holder 23 and the lower ones mounted on the lower die holder 22. The movable crank pin dies 12 of the first embodiment are disposed on the opposite side of specified positions of the corresponding rough crank pin portions Pa, whereas their counterparts, the auxiliary crank pin dies 13 are disposed on the same side of the specified positions of the corresponding rough crank pin portions Pa in the outside. For example, at the location of the first rough crank pin portion P1a, the specified position of the first rough crank pin portion P1a is located in the upper side. Thus the corresponding movable crank pin die 12 is mounted on the lower die holder 22, and its counterpart, the auxiliary crank pin die 13 is mounted on the upper die holder 23.

Particularly, all the movable crank pin dies 12 and the auxiliary crank pin dies 13, i.e., both the upper and lower dies, are axially movable toward the reference crank pin die 11 on the lower die holder 22 and the upper die holder 23, respectively. Only the movable crank pin dies 12 are movable in the direction perpendicular to the axial direction, i.e., the direction toward the specified positions of the rough crank pin portions Pa (upward direction in FIG. 4).

The movable crank pin dies 12 and the auxiliary crank pin dies 13 respectively have impressions 12a and 13a having a semi-cylindrical shape. The length of the impressions 12a and 13a is equal to the axial length of the rough crank pin portions Pb of the blank for finish forging 5.

The stationary journal dies 9U and 9B are disposed at locations of the corresponding rough journal portion Ja of the preform blank 4 (the second and third rough journal portions J2a and J3a) connecting with the rough oval arm portion Aa (the third and fourth rough arm portions A3a and A4a), with the upper ones mounted on the upper die holder 23 and the lower ones mounted on the lower die holder 22. Particularly, the stationary journal dies 9U and 9B, i.e., both the upper and lower ones, are completely secured to the upper die holder 23 and the lower die holder 22, respectively, and constrained from moving in the axial direction.

The stationary journal dies 9U and 9B have first impressions 9Ua and 9Ba, respectively, each having a semi-cylindrical shape and second impressions 9Ub and 9Bb, and third impressions 9Uc and 9Bc, respectively, each located at the front and back (right and left as seen in FIG. 4) the first impressions 9Ua and 9Ba and adjacent thereto. The length of the first impressions 9Ua and 9Ba is equal to the axial length of the rough journal portions Jb (the second and third rough journal portions J2b and J3b) of the blank for finish forging 5. The length of the second impressions 9Ub and 9Bb is equal to the axial thickness of the weighted rough arm portions Ab (the second and fifth rough arm portions A2b and A5b) connecting to the rough journal portions Jb of the blank for finish forging 5. The length of the third impressions 9Uc and 9Bc is equal to the axial thickness of the rough oval arm portions Ab (the third and fourth rough arm portion A3b and A4b) connecting to the rough journal portions Jb of the blank for finish forging 5.

By the downward movement of the press machine, the stationary journal dies 9U and 9B are caused to hold and retain the rough journal portions Ja with the corresponding first impressions 9Ua and 9Ba therebetween from above and below. Concurrently, the stationary journal dies 9U and 9B are brought into a state in which the second impressions 9Ub and 9Bb and the third impressions 9Uc and 9Bc, at their first impressions 9Ua and 9Ba-side surfaces, are in contact with the weighted rough arm portions Aa and the rough oval arm portions Aa connecting with the corresponding rough journal portions Ja, at their rough journal portion Ja-side side surfaces.

The movable journal dies 10U and 10B are disposed at locations of the corresponding the rough journal portions Ja (first and fourth rough journal portions J1a and J4a) of the preform blank 4 excluding the rough journal portions Ja (second and third rough journal portions J2a and J3a) connecting with the rough oval arm portions Aa (third and fourth rough arm portions A3a and A4a), with the upper ones mounted on the upper die holder 23 and the lower ones mounted on the lower die holder 22. Particularly, the movable journal dies 10U and 10B, i.e., both the upper and lower dies, are axially movable toward the reference crank pin die 11 to the upper die holder 23 and the lower die holder 22, respectively.

The movable journal dies 10U and 10B respectively have first impressions 10Ua and 10Ba having a semi-cylindrical shape and respectively have second impressions 10Ub and 10Bb, located adjacent to the first impressions 10Ua and 10Ba at the front and back (right and left as seen in FIG. 4). The length of the first impressions 10Ua and 10Ba is equal to the axial length of the rough journal portions Jb (first and fourth journal portions J1b and J4b) of the blank for finish forging 5. The length of the second impressions 10Ub and 10Bb is equal to the axial thickness of the weighted rough arm portions Ab (first and sixth rough arm portions A1b and A6b) connecting to the rough journal portions Jb of the blank for finish forging 5.

By the lowering of the upper die holder 23 caused by driving a press machine, i.e., the downward movement of the press machine, the movable journal dies 10U and 10B are caused to hold and retain the respective rough journal portions Ja from the upper and lower sides with the first impressions 10Ua and 10Ba. Concurrently, the movable journal dies 10U and 10B are brought into a state in which the second impressions 10Ub and 10Bb, at their first impression 10Ua and 10Ba-side surfaces, are in contact with the rough arm portions Aa, at their rough journal portion Ja-side side surfaces through which the weighted rough arm portions Aa and the respective rough journal portions Ja are connected.

In this operation, by the downward movement of the press machine, the reference crank pin die 11 and the movable crank pin dies 12 are placed in a state in which the impressions 11a and 12a are brought into contact with the rough crank pin portions Pa, and both side surfaces of the reference crank pin die 11 and the movable crank pin dies 12 are in contact with the rough arm portions Aa at their rough crank pin portion Pa-side side surfaces through which the rough arm portions Aa and rough crank pin portions Pa are connected.

The movable journal dies 10U and 10B disposed at locations of the corresponding first and fourth rough journal portions J1a and J4a at opposite ends have end surfaces, which are respectively referred to as inclined surfaces 14U and 14B. In relation to this, on the lower pressure pad 20, there are provided wedges 26, each located correspondingly to the location of the inclined surfaces 14U and 14B of the movable journal dies 10U and 10B for the first and fourth rough journal portions J1a and J4a. Each of wedges 26 extends upward penetrating through the lower die holder 22. The inclined surfaces 14B of the lower movable journal dies 10B, among the movable journal dies 10U and 10B for the first and fourth rough journal portions J1a and J4a, are in contact with the slopes of wedges 26 in the initial condition. On the other hand, the inclined surfaces 14U of the upper movable journal dies 10U are brought into contact with the slopes of wedges 26 by the downward movement of the press machine.

Then, with continued downward movement of the press machine, the upper movable journal dies 10U are pressed downwardly together with the lower movable journal dies 10B. This allows the movable journal dies 10U and 10B for the first and fourth rough journal portions J1a and J4a, i.e., both the upper and lower ones, to move axially toward the reference crank pin die 11 for the second rough crank pin portion P2a serving as a reference, as their inclined surfaces 14U and 14B slide along the slopes of the first wedges 26. Essentially, the movable journal dies 10U and 10B are all capable of being moved axially by the wedge mechanisms.

Then, the movable crank pin dies 12 and the auxiliary crank pin dies 13 are pressed downwardly together with continued downward movement of the press machine. Accordingly, with the axial movement of the movable journal dies 10U and 10B as described above, the movable crank pin dies 12 and the auxiliary crank pin dies 13 are moved axially along with them toward the reference crank pin die 11 for the second rough crank pin portion P2a serving as a reference. The movement of the reference crank pin die 11 and the movable crank pin die 12 in the direction perpendicular to the axial direction is accomplished by driving the hydraulic cylinders 16 coupled to the crank pin dies 11 and 12.

It should be noted that the axial movement of the movable crank pin dies 12 and the auxiliary crank pin dies 13 may be forcibly caused using a wedge mechanism similar to the one for the movable journal dies 10U and 10B or a separate mechanism such as a hydraulic cylinder or a servo motor or the like. The auxiliary crank pin dies 13 may be integral with one of their adjacent movable journal dies 10U and 10B or the stationary journal dies 9U and 9B forming pairs.

In the initial condition shown in FIG. 4, spaces are provided between the axially arranged movable journal dies 10U and 10B and the stationary journal dies 9U and 9B, and their corresponding movable crank pin dies 12 and auxiliary crank pin dies 13. The spaces are provided so as to allow the axial movement of the movable journal dies 10U and 10B as well as that of the movable crank pin dies 12 and the auxiliary crank pin dies 13. The size of the spaces represents the difference between the thickness of the rough arm portions Ab of the blank for finish forging 5 and the thickness of the weighted rough arm portions Aa of the preform blank 4.

Next, descriptions are given as to how the blank for finish forging is formed using the thus configured forming apparatus.

Figure 5A:
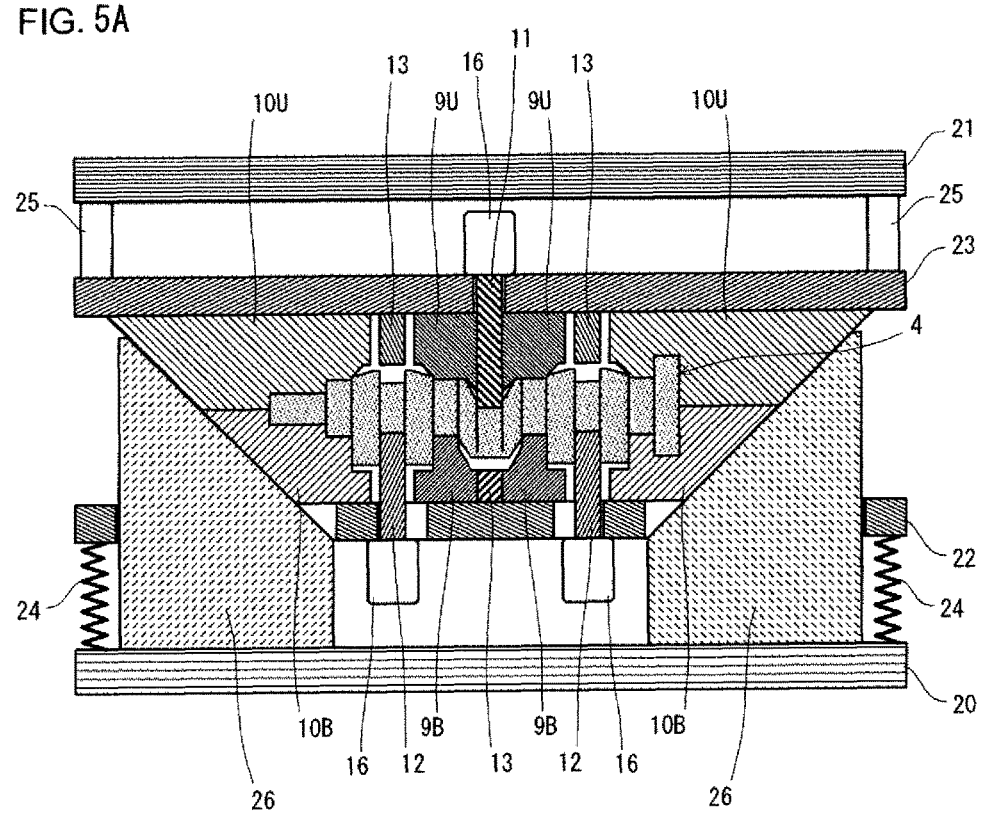
FIG. 5A is a longitudinal sectional view illustrating a process for forming a blank for finish forging using the forming apparatus according to the first embodiment shown in FIG. 4, with a forming state at an initial stage shown therein.

FIG. 5A and FIG. 5B are longitudinal sectional views illustrating a process for forming a blank for finish forging using the forming apparatus of the first embodiment shown in FIG. 4. Among these figures, FIG. 5A shows a forming state at the initial stage and FIG. 5B shows a forming state at the completion.

The preform blank 4 is placed in the lower movable journal die 10B, stationary journal die 9B, the movable crank pin dies 12, and the auxiliary crank pin dies 13, shown in FIG. 4, and then lowering of the press machine is started. Then, as shown in FIG. 5A, the upper movable journal dies 10U and stationary journal dies 9U are brought into contact with the corresponding lower movable journal dies 10B and stationary journal dies 9B.

Thus, the preform blank 4 is brought into a state in which the rough journal portions Ja are held by the movable journal dies 10U and 10B and stationary journal dies 9U and 9B from above and below, and the rough crank pin portions Pa are contacted by the reference crank pin die 11 and the movable crank pin dies 12. In this state, in the preform blank 4, the rough arm portions Aa, at their rough journal portion Ja-side side surfaces, are in contact with the movable journal dies 10U and 10B and stationary journal dies 9U and 9B, and the rough arm portions Aa, at their rough crank pin portion Pa-side side surfaces, are in contact with the reference crank pin die 11 and the movable crank pin dies 12. Further, in this state, the inclined surfaces 14U and 14B of the movable journal dies 10U and 10B for the first and fourth rough journal portions J1a and J4a are in contact with the slopes of wedges 26.

In this state, the lowering of the press machine is continued. Accordingly, the inclined surfaces 14U and 14B of the movable journal dies 10U and 10B for the first and fourth rough journal portions J1a and J4a slide along the slopes of the first wedges 26, and by this wedge mechanism, these journal dies 10U and 10B are allowed to move axially toward the reference crank pin die 1 for the second rough crank pin portion P2a. By such axial movement of the movable journal dies 10U and 10B caused by the wedge mechanism, the movable crank pin dies 12 and the auxiliary crank pin dies 13 are also allowed to move axially toward the reference crank pin die 11.

Accordingly, the spaces between the movable journal dies 10U and 10B and stationary journal dies 9U and 9B, the movable crank pin dies 12, and the auxiliary crank pin dies 13 are gradually narrowed, and finally filled. In this process, in the preform blank 4, the rough arm portions Aa are axially compressed by the movable journal dies 10U and 10B and stationary journal dies 9U and 9B, the reference crank pin die 11, and the movable crank pin dies 12, while the axial lengths of the rough journal portions Ja and the rough crank pin portions Pa are maintained, so that the thickness of the weighted rough arm portions Aa is reduced to the thickness of the weighted rough arm portions Ab of the blank for finish forging 5 (see FIG. 5B).

Also, in coordination with the axial movement of the movable journal dies 10U and 10B as well as that of the movable crank pin dies 12 and the auxiliary crank pin dies 13, each of the hydraulic cylinders 16 for the reference crank pin die 11 and the movable crank pin dies 12 is operated. Accordingly, the crank pin dies 11 and 12 press the corresponding rough crank pin portions Pa of the preform blank 4 in the direction perpendicular to the axial direction. Thus, the rough crank pin portions Pa of the preform blank 4 are displaced in the vertical direction perpendicular to the axial direction, and an amount of eccentricity thereof is increased to an amount of eccentricity of the rough crank pin portions Pb of the blank for finish forging 5, bringing into a state in which all the rough crank pin portions Pb are disposed in their specified positions (see FIGS. 2 and 5B).

In this manner, it is possible to form, from the preform blank 4 without a flash, the blank for finish forging 5 without a flash, which has a shape generally in agreement with the shape of the forged crankshaft for the three-cylinder engine having thin arms A (forged final product), even with the weighted arms A. By supplying such a blank for finish forging 5 without a flash for finish forging, and performing finish forging with it, it is possible to obtain the final shape of the forged crankshaft for the three-cylinder engine including the contour shape of arms and the placement angle of the crank pins, although some minor amount of flash is generated. Therefore, forged crankshafts for three-cylinder engines can be manufactured with high material utilization and also with high dimensional accuracy regardless of their shapes.

In the forming apparatus shown in FIGS. 4, 5A and 5B, the inclined surfaces 14U and 14B of the movable journal dies 10U and 10B for the first rough journal portion J1a and its contacting slope of wedge 26, and the inclined surfaces 14U and 14B of the movable journal dies 10U and 10B for the fourth rough journal portion J4a and its contacting slope of wedge 26 are angled in a reverse relationship relative to a vertical plane. The purpose of varying, for each of the movable journal dies 10U and 10B, the wedge angle of the wedge mechanism, which causes the axial movement of the movable journal dies 10U and 10B, is to ensure that the rate of deformation at which the weighted rough arm portions Aa are axially compressed to reduce the thickness thereof stays constant for all the weighted rough arm portions Aa.

In the preform blank 4, which is processed by the forming apparatus shown in FIGS. 4, 5A and 5B, the rough journal portions Ja have a cross-sectional area that is equal to or greater than that of the rough journal portions Jb of the blank for finish forging 5, i.e., that of the journals J of the forged crankshaft. Similarly, the rough crank pin portions Pa of the preform blank 4 have a cross-sectional area that is equal to or greater than that of the rough crank pin portions Pb of the blank for finish forging 5, i.e., that of the crank pins P of the forged crankshaft. Even when the cross-sectional area of the rough journal portions Ja of the preform blank 4 is greater than the cross-sectional area of the rough journal portions Jb of the blank for finish forging 5, it is possible to reduce the cross-sectional area of the rough journal portions Ja to the cross-sectional area of the rough journal portions Jb of the blank for finish forging 5. This is caused by the holding and retaining of the rough journal portions Ja by the movable journal dies 10U and 10B and by the subsequent axial movement of the movable journal dies 10U and 10B. Even when the cross-sectional area of the rough crank pin portions Pa of the preform blank 4 is greater than the cross-sectional area of the rough crank pin portions Pb of the blank for finish forging 5, the cross-sectional area of the rough crank pin portions Pa can be reduced to the cross-sectional area of the rough crank pin portions Pb of the blank for finish forging 5. This is caused by, in addition to the movement of the reference crank pin die 11 in the direction perpendicular to the axial direction, the movement of the movable crank pin dies 12 in the axial direction and the direction perpendicular thereto.

An issue to be addressed regarding the forming of the blank for finish forging described above is local formation of fin flaws against the weighted rough arm portion Aa. The following describes how fin flaws are formed and how they can be prevented.

Figure 6:
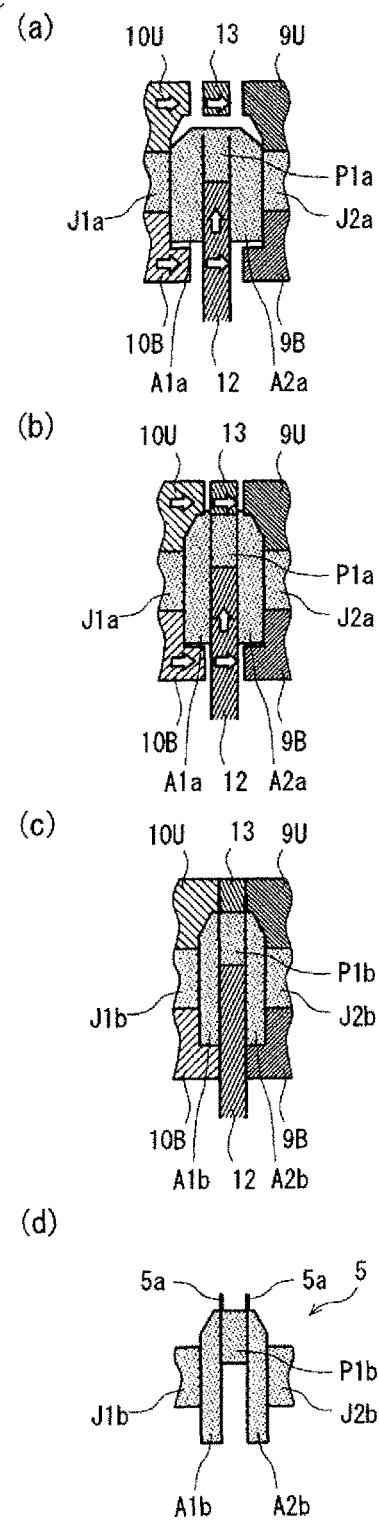
FIG. 6 is a diagram illustrating how fin flaws occur in forming a blank for finish forging using the forming apparatus.
Figure 7:
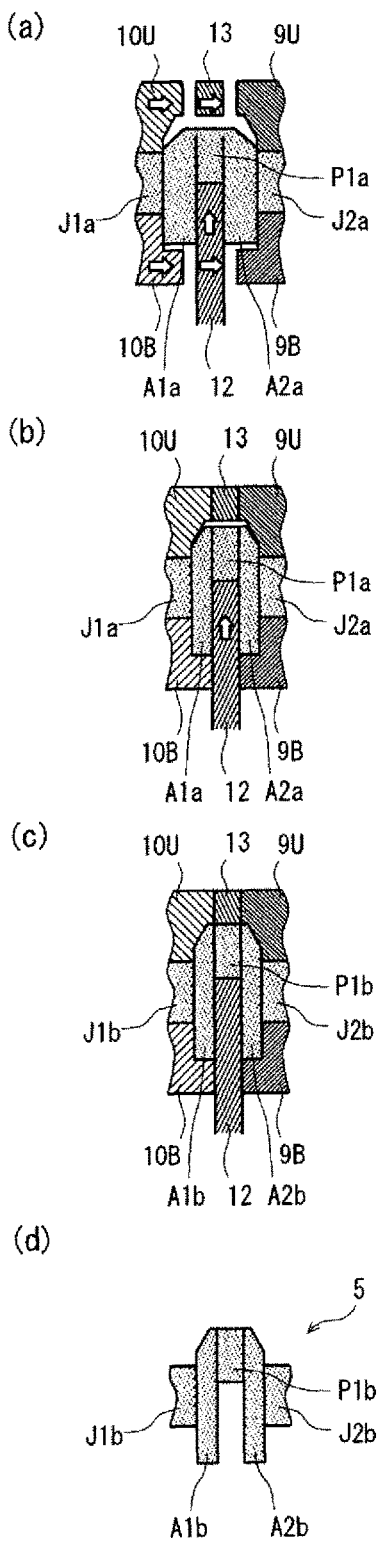
FIG. 7 is a diagram illustrating how fin flaws are prevented by taking a measure in forming a blank for finish forging using the forming apparatus.

FIG. 6 is a diagram illustrating how fin flaws occur in forming a blank for finish forging using the forming apparatus, and FIG. 7 is a diagram illustrating how fin flaws are prevented by taking a measure. In FIGS. 6 and 7, there are shown (a) a forming state at an initial stage, (b) a forming state during the process, (c) a forming state at the completion, and (d) a blank for finish forging, which is removed from the forming apparatus after the completion of forming.

As shown in FIG. 6(a), upon the start of the forming operation, the movable journal dies 10U and 10B move axially, and the movable crank pin dies 12 and the auxiliary crank pin dies 13 move axially and in the direction perpendicular to this direction. Then, as shown in FIG. 6(b), in the weighted rough arm portions Aa, if the rough crank pin portions Pa in the process of pressing deformation in the direction perpendicular to the axial direction reach the auxiliary crank pin dies 13 before the completion of the axial movement of the movable journal dies 10U and 10B, and the movable crank pin dies 12 and the auxiliary crank pin dies 13, i.e., before the spaces between the movable journal dies 10U and 10B and the stationary journal dies 9U and 9B, and their corresponding movable crank pin dies 12 and auxiliary crank pin dies 13 are filled, a problem to be described below will occur. The fillings of the rough crank pin portions Pa flow into the spaces between the auxiliary crank pin dies 13 and the movable journal dies 10U and 10B and stationary journal dies 9U and 9B. Although the fillings that have flowed thereinto are thinned with the progress of the forming operation, they stay there even after the forming operation is completed as shown in FIG. 6(c). Thus, as shown in FIG. 6(d), fin flaws 5a, coming out of the rough crank pin portions Pb of the blank for finish forging 5, are formed locally at the boundaries with adjacent weighted rough arm portions Aa.

In the subsequent finish forging step, the fin flaws 5a will be struck into the finished product, resulting in causing overlaps. Therefore, in order to ensure product quality, it is necessary to prevent the formation of the fin flaws.

One measure to prevent the formation of the fin flaws may be to control the movement of the movable crank pin dies 12 in the direction perpendicular to the axial direction so that the rough crank pin portions Pa to be processed for deformation by pressing reach the auxiliary crank pin dies 13 after the spaces between the movable journal dies 10U and 10B and stationary journal dies 9U and 9B, the movable crank pin dies 12, and the auxiliary crank pin dies 13 in weighted rough arm portions Aa, are filled. Specifically, it may be configured such that the axial movement of the movable journal dies 10U and 10B as well as that of the movable crank pin dies 12 and the auxiliary crank pin dies 13 forming pair with the movable crank pin dies 12 is completed, thereafter the movement of the movable crank pin dies 12 in the direction perpendicular to the axial direction is completed. For example, when the total moved distance of the movable crank pin dies 12 in the direction perpendicular to the axial direction is designated as a 100% moved distance thereof, it is preferred that, when the axial movement of the movable journal dies 10U and 10B that are adjacent to the movable crank pin dies 12 is completed, the moved distance of the movable crank pins die 12 in the direction perpendicular to the axial direction is 90% or less (more preferably 83% or less, and even more preferably 60% or less) of the total moved distance. Thereafter, the movement of the movable crank pin dies 12 in the same direction may be completed.

For example, the forming operation is started as shown in FIG. 7(a). And then, as shown in FIG. 7(b), the axial movement of the movable journal dies 10U and 10B as well as that of the movable crank pin dies 12 and the auxiliary crank pin dies 13 are completed before the length of movement of the movable crank pin dies 12 in the direction perpendicular to the axial direction reaches 90% of the total length of movement in weighted rough arm portions Aa. Consequently, by this time, the spaces between the movable journal dies 10U and 10B and stationary journal dies 9U and 9B, the movable crank pin dies 12, and the auxiliary crank pin dies 13 have been filled, whereas the rough crank pin portions Pa to be processed for deformation by pressing have not reached the auxiliary crank pin dies 13. Subsequently, along with the movement of the movable crank pin dies 12 in the direction perpendicular to the axial direction, the rough crank pin portions Pa reach the auxiliary crank pin dies 13, and with the completion of the movement, the forming is completed as shown in FIG. 7(c). Thus, no such problem occurs as the fillings of the rough crank pin portions Pa flow into the spaces between the auxiliary crank pin dies 13 and the movable journal dies 10U and 10B and stationary journal dies 9U and 9B. As a result, as shown in FIG. 7(d), a high quality blank for finish forging 5 without the fin flaws can be obtained.

The process of movement of the movable crank pin dies in the direction perpendicular to the axial direction before the completion of the axial movement of the movable journal dies may be varied as desired. For example, the movement of the movable crank pin dies in the direction perpendicular to the axial direction may be started simultaneously with the start of the axial movement of the movable journal dies or in advance of that, or conversely, it may be started after the axial movement of the movable journal dies has progressed to some extent. Also, the movement of the movable crank pin dies in the direction perpendicular to the axial direction may be stopped temporarily after its start, at positions a certain distance away from their initial positions, and it may be resumed after the completion of the axial movement of the movable journal dies.

2. Second Embodiment

A second embodiment is based on the configuration of the first embodiment described above. A second embodiment includes a twisting step in a process of manufacturing a forged crankshaft as well as modifications of the configuration related to this step.

2-1. Preform Blank, Blank for Finish Forging, Forged Product, and Twisted Product FIG. 8 is a diagram schematically showing the shapes of a preform blank to be processed by the forming apparatus, a blank for finish forging formed therefrom, a forged product after finish forging, and a twisted product after twisting, in the manufacturing method of the second embodiment. FIG. 8 shows how a three-cylinder four-counterweight crankshaft is manufactured, as seen in FIG. 2. This is also the case for third and fourth embodiments described later.

As shown in FIG. 8, a preform blank 4 of the second embodiment has a crankshaft shape that is approximate to the shape of a forged crankshaft 1 for a three-cylinder four-counterweight, but is generally in rough shape. The preform blank 4 includes four rough journal portions Ja, three rough crank pin portions Pa, a rough front part portion Fra, a rough flange portion Fla, and six rough arm portions Aa. A blank for finish forging 5 of the second embodiment is formed from the preform blank 4 described above using a forming apparatus, details of which will be provided later. The blank for finish forging 5 includes four rough journal portions Jb, three rough crank pin portions Pb, a rough front part portion Frb, a rough flange portion Flb, and six rough arm portions Ab. A forged product 6 of the second embodiment is obtained from the blank for finish forging 5 described above by finish forging. The forged product 6 includes four journals Jc, three crank pins Pc, a front part Frc, a flange Flc, and six arms Ac.

A twisted product 7 of the second embodiment is obtained from the forged product 6 described above by twisting. The twisted product 7 includes four journals J1d to J4d, three crank pins P1d to P3d, a front part Frd, a flange Fld, and six crank arms A1d to A6d (hereinafter also referred to simply as "arms") that alternatively connect the journals J1d to J4d, and the crank pins P1d to P3d to each other. Hereinafter, when the journals J1d to J4d, the crank pins P1d to P3d, and the arms A1d to A6d, of the twisted product 7, are each collectively referred to, a reference character "Jd" is used for the journals, a reference character "Pd" for the crank pins, and a reference character "Ad" for the arms.

The twisted product 7 has a shape that is in agreement with a shape of a crankshaft (forged final product) including a placement angle of the crank pins Pd. Specifically, the journals Jd of the twisted product 7 have an axial length equal to that of the journals J of the forged crankshaft having the final shape. The crank pins Pd of twisted product 7 have an axial length equal to that of the crank pins P of the forged crankshaft having the final shape. Further, the crank pins Pd of the twisted product 7 have the same amount of eccentricity in the direction perpendicular to the axial direction and the same placement angle of 120° as the crank pins P of the forged crankshaft having the final shape, thus they are placed at the specified positions. The arms Ad of the twisted product 7 have an axial thickness equal to that of arms A of the forged crankshaft having the final shape.

The forged product 6 has a shape that is in agreement with the shape of the crankshaft (forged final product) excluding the placement angle of the crank pins Pc. Specifically, the journals Jc of the forged product 6 have an axial length equal to that of the journals J of the forged crankshaft having the final shape. The crank pins Pc of the forged product 6 have an axial length equal to that of the crank pins P of the forged crankshaft having the final shape, and an amount of eccentricity in the direction perpendicular to the axial direction is the same between them. However, the placement angle of the crank pins Pc of the forged product 6 is deviated from specified positions. Specifically, among the crank pins Pc of the forged product 6, the first and third crank pins P1c and P3c at opposite ends are eccentric in the direction perpendicular to the axial direction in the same direction. The second crank pins P2c in the center is eccentric in the direction opposite to an eccentric direction of the first and third crank pins P1c and P3c. The arms Ac of the forged product 6 have an axial thickness equal to that of arms A of the forged crankshaft having the final shape.

The blank for finish forging 5 has a shape that is generally in agreement with the shape of the forged product 6. Specifically, the rough journal portions Jb of the blank for finish forging 5 have an axial length equal to that of the journals J of the forged crankshaft having the final shape (journals Jc of forged product 6). The rough crank pin portions Pb of the blank for finish forging 5 have an axial length equal to that of the crank pins P of the forged crankshaft having the final shape (crank pins Pc of forged product 6), and the amount of eccentricity in the direction perpendicular to the axial direction is the same between them. However, the placement angle of the blank for finish forging 5 is, like the forged product 6, deviated from the specified positions. The rough arm portions Ab of the blank for finish forging 5 have an axial thickness equal to that of the arms A of the forged crankshaft having the final shape (arms Ac of forged product 6).

In contrast, the rough journal portions Ja of the preform blank 4 have an axial length equal to that of the rough journal portions Jb of the blank for finish forging 5, i.e., that of the journals J of the forged crankshaft (journals Jc of forged product 6). The rough crank pin portions Pa of the preform blank 4 have an axial length equal to that of the rough crank pin portions Pb of the blank for finish forging 5, i.e., that of the crank pins P of the forged crankshaft (crank pins Pc of forged product 6), but have a smaller amount of eccentricity than that of the rough crank pin portions Pb of the blank for finish forging 5. Specifically, among the rough crank pin portions Pa of the preform blank 4, the first and third rough crank pin portions P1a and P3a at opposite ends are eccentric in the same direction with an amount of eccentricity thereof equal to about a half of an amount of eccentricity in the crank pins P of the forged crankshaft. On the other hand, the second rough crank pin portion P2a in the center is eccentric in a direction opposite to an eccentric direction of the first and third rough crank pin portions P1a and P3a with an amount of eccentricity equal to about a half of an amount of eccentricity in the crank pin P of the forged crankshaft.

Among the rough arm portions Aa of the preform blank 4, the weighted rough arm portions Aa (the first, second, fifth and sixth rough arm portions A1a, A2a, A5a, and A6a) have an axial thickness greater than that of the respective weighted rough arm portions Ab of the blank for finish forging 5, i.e., weighted arms A of the forged crankshaft (the weighted arms Ac of the forged product 6). On the other hand, the oval rough arm portions Aa of the preform blank 4 (the third and fourth rough arm portions A3a and A4a) have an axial thickness equal to that of the respective oval rough arm portions Ab of the blank for finish forging 5, i.e., the oval arms A of the forged crankshaft (the oval arm Ac).

2-2. Process for Manufacturing Forged Crankshaft

Figure 9:
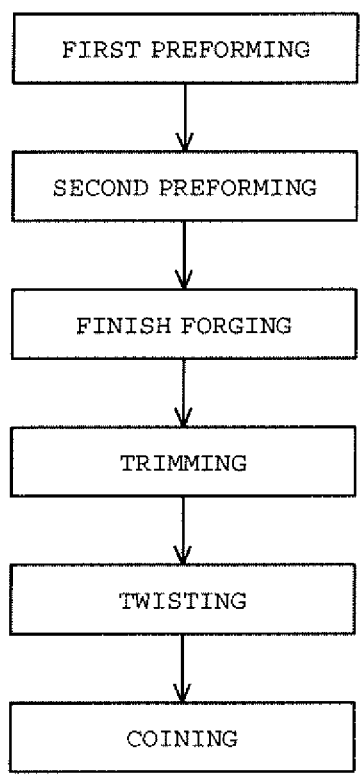
FIG. 9 is a schematic diagram illustrating a process for manufacturing a forged crankshaft according to the second embodiment.

FIG. 9 is a schematic diagram illustrating a process for manufacturing a forged crankshaft according to the second embodiment. As shown in FIG. 9, the process for manufacturing the forged crankshaft for the three-cylinder engine of the second embodiment includes a first preforming step, a second preforming step, a finish forging step, and a twisting step, and also includes a trimming step before the twisting step and a coining step after the twisting step as necessary.

The first preforming step is a step in which the preform blank 4 described above is obtained. The second preforming step is a step in which the blank for finish forging 5 described above having the final shape of the forged crankshaft excluding the placement angle of crank pins is obtained from the preform blank 4 described above by using a forming apparatus described in FIG. 10 below. The finish forging step is a step in which the blank for finish forging 5 is supplied to be processed by finish forging, whereby the forged product 6 described above having the final shape of the forged crankshaft excluding the placement angle of crank pins is obtained.

The twisting step is a step in which the twisted product 7 described above is obtained. In the twisting step, in a state in which the journals and the crank pins of the forged product 6 described above are held and retained, the journals are twisted around these axial centers in order to adjust the placement angle of the crank pins of the forged product 6 to the placement angle of the crank pins of the forged crankshaft. In this manner, the twisted product 7 having a final shape that is in agreement with the shape of the crankshaft of the forged crankshaft including the placement angle can be obtained.

2-3. Apparatus for Forming Blank for Finish Forging

Figure 10:
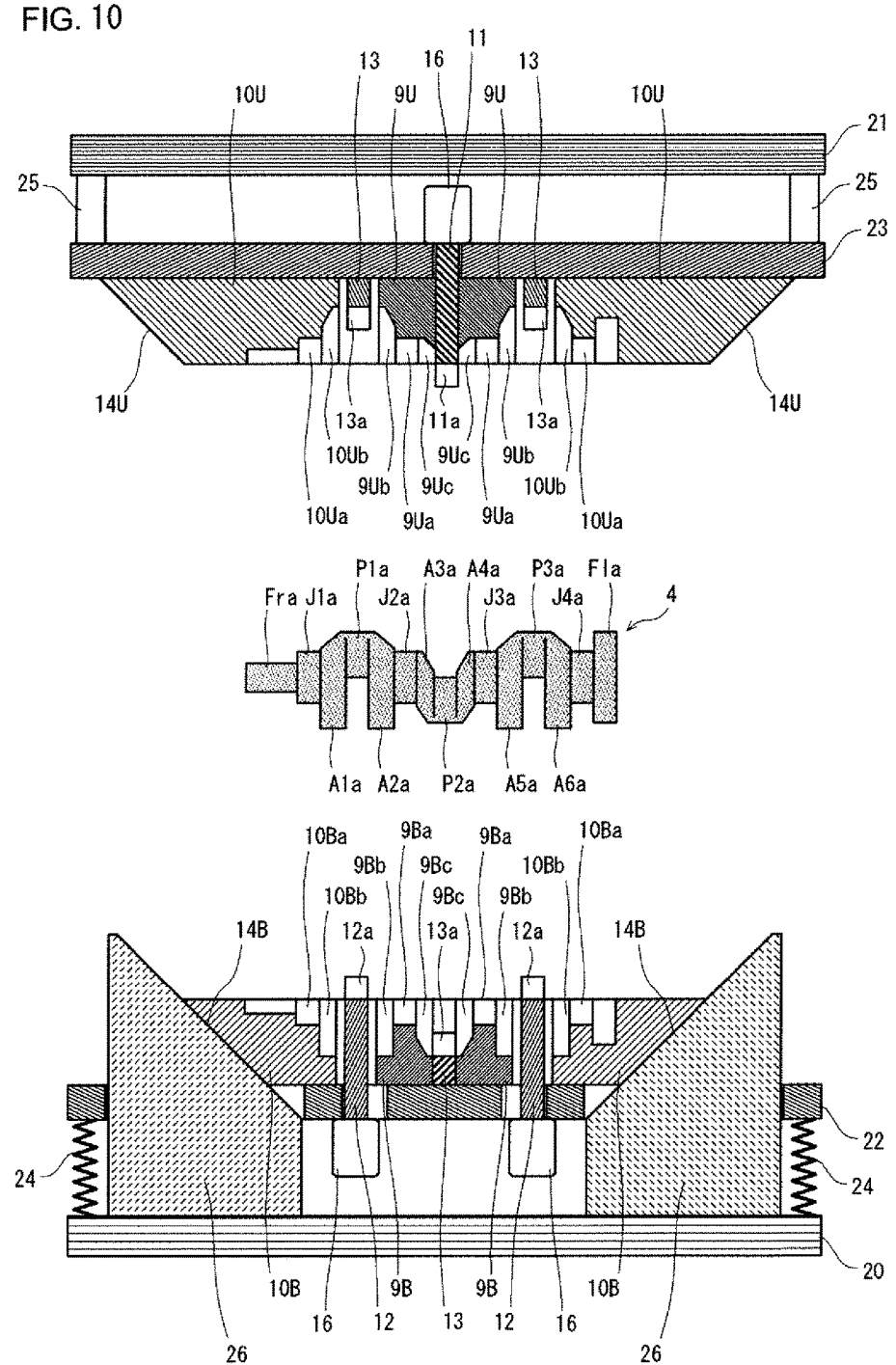
FIG. 10 is a longitudinal sectional view showing a configuration of the forming apparatus according to the second embodiment.

FIG. 10 is a longitudinal sectional view showing a configuration of the forming apparatus according to the second embodiment. FIG. 10 illustrates, as an example, the forming apparatus configured to form the blank for finish forging 5 from the preform blank 4 shown in FIG. 8. It should be noted that in the longitudinal sectional view shown in FIG. 10, all parts of the rough crank pin portions are actually on the same plane.

In the forming apparatus of the second embodiment shown in FIG. 10, the preform blank 4 is placed in the dies in a manner such that an eccentric direction of the rough crank pin portions Pa is in the vertical direction. For example, the preform blank 4 is placed in a manner such that the first and third rough crank pin portions P1a and P3a are positioned in the upper side and the second rough crank pin portion P2a is positioned in the lower side. The preform blank 4 placed in such a manner is formed into the blank for finish forging 5. Other than this, the same configuration is shared with the forming apparatus of the first embodiment shown in FIG. 4, thus the detailed description thereof will be omitted.

Figure 11A:
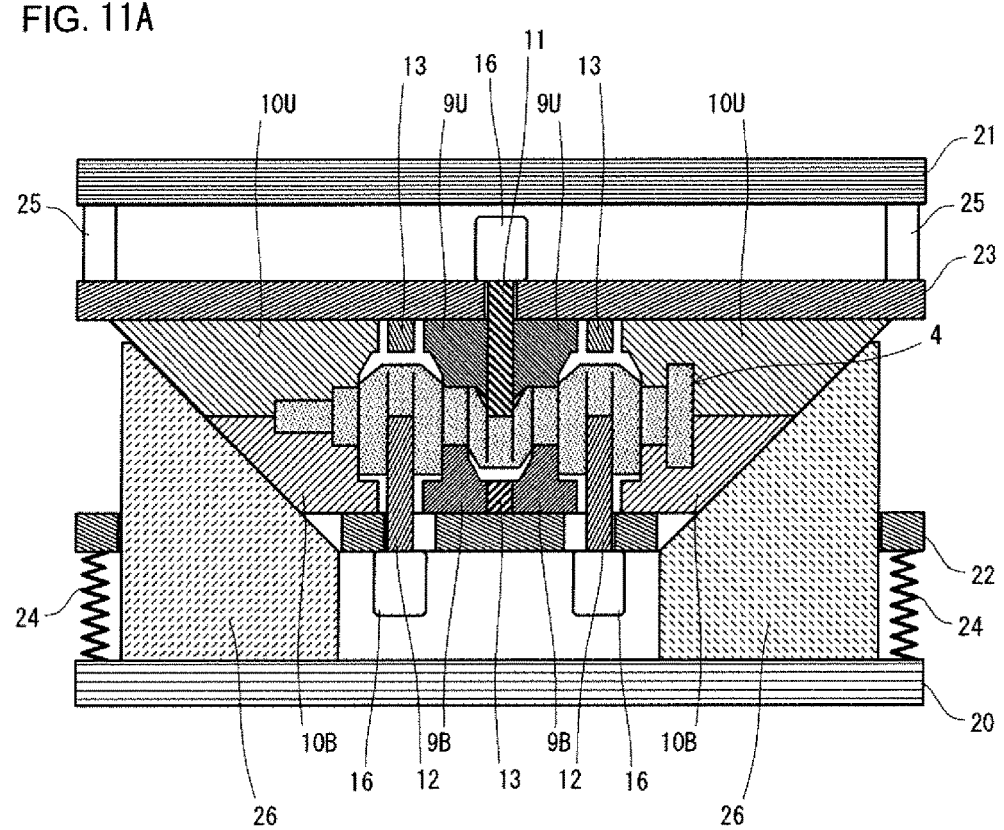
FIG. 11A is a longitudinal sectional view illustrating a process for forming a blank for finish forging using the forming apparatus according to the second embodiment shown in FIG. 10, with a forming state at an initial stage shown therein.

FIGS. 11A and 11B are longitudinal sectional views illustrating a process for forming the blank for finish forging using the forming apparatus according to the second embodiment shown in FIG. 10. Among these figures, FIG. 11A shows a forming state at an initial stage and 11B shows a forming state at the completion.

As shown in FIG. 11A, the preform blank 4 is placed in the lower movable journal dies 10B, stationary journal die 9B, movable crank pin dies 12, and auxiliary crank pin dies 13, and then the downward movement of the press machine is performed. This allows the movable journal dies 10U and 10B holding and retaining each rough journal portion Ja to move axially toward the reference crank pin die 11 in contact with the second rough crank pin portion P2a. Concurrently, the movable crank pin dies 12 and the auxiliary crank pin dies 13 in contact with the first and third rough crank pin portions P1a and P3a are moved axially toward the reference crank pin die 11. By this operation, in the preform blank 4, the weighted rough arm portions Aa are axially compressed by the movable journal dies 10U and 10B, the stationary journal dies 9U and 9B, the reference crank pin die 11, and the movable crank pin dies 12, while the axial lengths of the rough journal portions Ja and the rough crank pin portions Pa are maintained. Then, the thickness of the weighted rough arm portions Aa is reduced to the thickness of the weighted rough arm portions Ab of the blank for finish forging 5 (see FIG. 11B).

Also, in coordination with the axial movement of the movable journal dies 10U and 10B as well as that of the movable crank pin dies 12 and the auxiliary crank pin dies 13, the reference crank pin dies 11 and the movable crank pin dies 12 press the rough crank pin portions Pa of the preform blank 4 in the direction perpendicular to the axial direction by the operation of each hydraulic cylinders 16. By this operation, the rough crank pin portions Pa of the preform blank 4 are displaced in the direction perpendicular to the axial direction, thus despite that the placement angle of the rough crank pin portions Pa is deviated from the specified positions, the amount of eccentricity thereof is increased to the amount of eccentricity of the rough crank pin portions Pb of the blank for finish forging 5 (see FIGS. 8 and 11B).

In this manner, it is possible to form, from the preform blank 4 without a flash, the blank for finish forging 5 without a flash, which has a shape generally in agreement with the shape of the forged crankshaft for the three-cylinder engine (forged final product) excluding the placement angle of the crank pins P. By supplying such a blank for finish forging 5 without a flash for finish forging, and performing finish forging with it, it is possible to obtain the forged product 6 having the final shape of the forged crankshaft for the three-cylinder engine but excluding the placement angle of the crank pins, although some minor amount of flash is generated. Then, by performing the twisting on the forged product 6, it is possible to obtain the final shape of the forged crankshaft for the three-cylinder engine including the placement angle of the crank pins. Therefore, forged crankshafts for three-cylinder engines can be manufactured with high material utilization and also with high dimensional accuracy regardless of their shapes.

3. Third Embodiment

A third embodiment is based on the configuration of the first and second embodiments described above. The third embodiment includes modifications in the relevant parts of the configuration, so that a final shape of a forged crankshaft can be formed as desired in finish forging step without applying the twisting step in a process of manufacturing the forged crankshaft.

3-1. Preform Blank, Blank for Finish Forging, and Forged Product

FIG. 12 is a diagram schematically showing the shapes of a preform blank to be processed by the forming apparatus, a blank for finish forging formed therefrom, and a forged product after finish forging, in the manufacturing method of the third embodiment. FIG. 12 shows, similar to FIGS. 2 and 8 above, how a three-cylinder four-counterweight crankshaft is manufactured.

As shown in FIG. 12, the preform blank 4 of the third embodiment has a crankshaft shape that is approximate to the shape of a forged crankshaft 1 for the three-cylinder four-counterweight, but is generally in a rough shape. The preform blank 4 includes four rough journal portions Ja, three rough crank pin portions Pa, a rough front part portion Fra, a rough flange portion Fla, and six rough arm portions Aa. The blank for finish forging 5 of the third embodiment is formed from the preform blank 4 described above using a forming apparatus, details of which will be provided below. The blank for finish forging 5 includes four rough journal portions Jb, three rough crank pin portions Pb, a rough front part portion Frb, a rough flange portion Flb, and six rough arm portions Ab. The forged product 6 of the third embodiment is obtained from the blank for finish forging 5 described above by finish forging. The forged product 6 includes four journals Jc, three crank pins Pc, a front part Frc, a flange Flc, and six arms Ac.

The forged product 6 has a shape that is in agreement with the shape of the crankshaft (forged final product) including a placement angle of the crank pins Pc. Specifically, the journals Jc of the forged product 6 have an axial length equal to that of the journals J of the forged crankshaft having the final shape. The crank pins Pc of the forged product 6 have an axial length equal to that of the crank pins P of the forged crankshaft having the final shape. Further, the crank pins Pc of the forged product 6 have the same amount of eccentricity in a direction perpendicular to an axial direction and the same placement angle of 120° as the crank pins P of the forged crankshaft having the final shape, thus they are placed at the specified positions. The arms Ac of the forged product 6 have an axial thickness equal to that of arms A of the forged crankshaft having the final shape.

In contrast, the rough journal portions Jb of the blank for finish forging 5 have an axial length equal to that of the journals Jc of forged product 6, i.e., that of the journals J of the forged crankshaft. The rough crank pin portions Pb of the blank for finish forging 5 have an axial length equal to that of the crank pins Pc of forged product 6, i.e., that of the crank pins P of the forged crankshaft, but both the amount of eccentricity and the placement angle of the rough crank pin portions Pb are deviated from the specified positions. Specifically, among the rough crank pin portions Pb of the blank for finish forging 5, the first and third rough crank pin portions P1b and P3b at opposite ends are eccentric in the opposite direction to each other with an amount of eccentricity equal to a √3/2 of an amount of eccentricity in the crank pins P of the forged crankshaft. On the other hand, the second rough crank pin portion P2b is not eccentric and has an amount of eccentricity of zero. The rough arm portions Ab of the blank for finish forging 5 have an axial thickness equal to that of the arms A of the forged crankshaft having the final shape (arms Ac of forged product 6).

Also, the rough journal portions Ja of the preform blank 4 have an axial length equal to that of the rough journal portions Jb of the blank for finish forging 5, i.e., that of the journals J of the forged crankshaft (journals Jc of forged product 6). The rough crank pin portions Pa of the preform blank 4 have an axial length equal to that of the rough crank pin portions Pb of the blank for finish forging 5, i.e., that of the crank pins P of the forged crankshaft (crank pins Pc of forged product 6). However, among the rough crank pin portions Pa of the preform blank 4, the first and third rough crank pin portions P1a and P3a have a smaller amount of eccentricity than that of the rough crank pin portions Pb of the blank for finish forging 5, and are eccentric in the opposite direction to each other with an amount of eccentricity less than the √3/2 of the amount of eccentricity in the crank pins P of the forged crankshaft. On the other hand, the second rough crank pin portion P2a has an amount of eccentricity of zero, similar to the second rough crank pin portion P2b in the blank for finish forging 5.

Among the rough arm portions Aa of the preform blank 4, the weighted rough arm portions Aa (the first, second, fifth and sixth rough arm portions A1a, A2a, A5a, and A6a) have an axial thickness greater than that of the respective weighted rough arm portions Ab of the blank for finish forging 5, i.e., weighted arms A of the forged crankshaft (the weighted arms Ac of the forged product 6). On the other hand, the oval rough arm portions Aa of the preform blank 4 (the third and fourth rough arm portions A3a and A4a) have an axial thickness equal to that of the respective oval rough arm portions Ab of the blank for finish forging 5, i.e., the oval arms A of the forged crankshaft (the oval arm Ac).

3-2. Process for Manufacturing Forged Crankshaft

Figure 13:
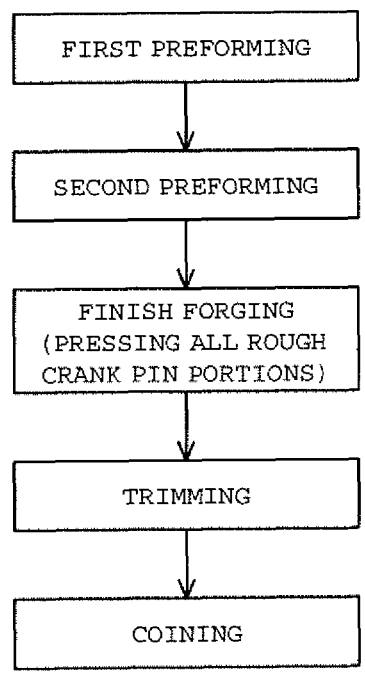
FIG. 13 is a schematic diagram illustrating a process for manufacturing a forged crankshaft according to the third embodiment.

FIG. 13 is a schematic diagram illustrating a process for manufacturing the forged crankshaft according to the third embodiment. As shown in FIG. 13, the process for manufacturing the forged crankshaft for the three-cylinder engine of the third embodiment includes a first preforming step, a second preforming step, and a finish forging step, and also includes a trimming step and a coining step as necessary.

The first preforming step is a step in which the preform blank 4 described above is obtained. The second preforming step is a step in which the blank for finish forging 5 described above having the final shape of the forged crankshaft is obtained from the preform blank 4 described above excluding the amount of eccentricity and the placement angle of all the crank pins, by using a forming apparatus described in FIG. 14 below.

The finish forging step is a step in which the forged product 6 described above is obtained. In the finish forging step, the blank for finish forging 5 described above is supplied to be processed by press forging with a pair of upper and lower dies in a state in which the first and third rough crank pin portions are horizontally positioned, whereby all rough crank pin portions are pressed in the vertical direction perpendicular to the axial direction. By this operation, the forged product 6 having a shape in agreement with the shape of the crankshaft of the forged crankshaft having the final shape can be obtained including the placement angle of the crank pins.

3-3. Apparatus for Forming Blank for Finish Forging

Figure 14:
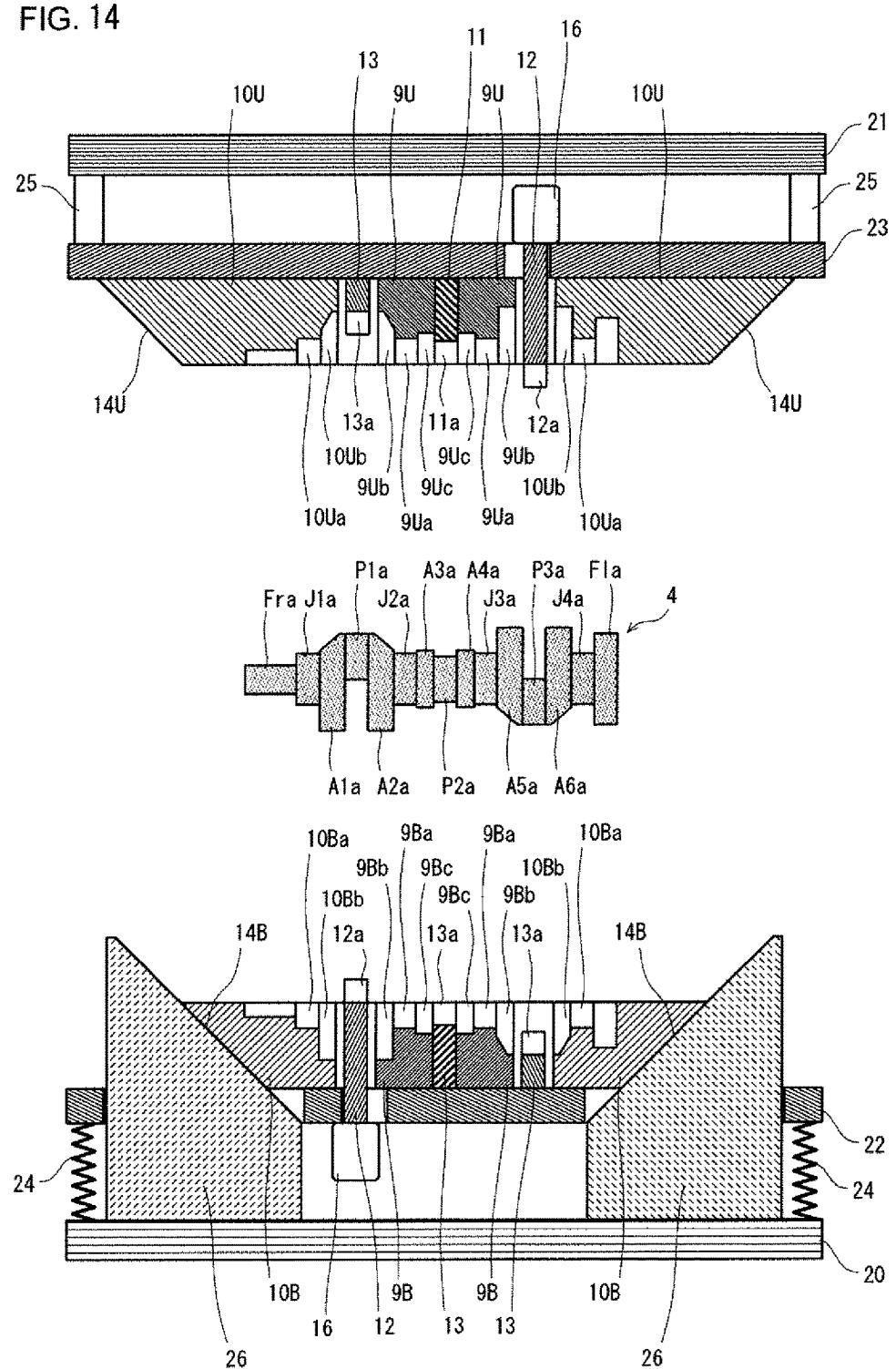
FIG. 14 is a longitudinal sectional view showing a configuration of the forming apparatus according to the third embodiment.

FIG. 14 is a longitudinal sectional view showing a configuration of the forming apparatus according to the third embodiment. FIG. 14 illustrates, as an example, the forming apparatus that is used in forming the blank for finish forging 5 from the preform blank 4 shown in FIG. 12. It should be noted that in the longitudinal sectional view shown in FIG. 14, all parts of the rough crank pin portions are actually on the same plane.

The forming apparatus of the third embodiment shown in FIG. 14 differs from the forming apparatus of the first embodiment shown in FIG. 4 and the forming apparatus of the second embodiment shown in FIG. 10 largely in the following. In the forming apparatus of the third embodiment, the preform blank 4 is placed in the dies in a manner such that the first and third rough crank pin portions P1*a* and P3*a* which are eccentric in the opposite direction to each other are vertically positioned. The preform blank 4 in this manner is formed into the blank for finish forging 5. In this process, the reference crank pin die 11 disposed in the location of the second rough crank pin portion P2*a* is constrained from moving not only in the axial direction but also in the direction perpendicular to the axial direction. For this reason, the reference crank pin die 11 of the third embodiment is, unlike the one in the first and second embodiments, not coupled to a hydraulic cylinder, instead, directly mounted to one of the upper die holder 23 and the lower die holder 22. To the other one, the auxiliary crank pin die 13 forming a pair with the reference crank pin die 11 is directly mounted. FIG. 14 shows a mode in which the reference crank pin die 11 is mounted to the upper die holder 23 while the auxiliary crank pin die 13 is mounted to the lower die holder 22.

Further, in the forming apparatus of the third embodiment, the movable crank pin dies 12 and the auxiliary crank pin dies 13 are disposed at locations of the rough crank pin portions P1*a* and P3*a*. However, a vertical arrangement of the movable crank pin dies 12 and the auxiliary crank pin dies 13 is reversed between the locations of the first and third rough crank pin portions P1*a* and P3*a*. This is because the first and third rough crank pin portions P1*a* and P3*a* are eccentric in the opposite direction to each other in the vertical direction. FIG. 14 shows a mode in which the auxiliary crank pin die 13 at the location of the first rough crank pin portion P1*a* and the movable crank pin die 12 at the location of the third rough crank pin portion P3*a* are disposed on the upper side while the movable crank pin die 12 at the location of the first rough crank pin portion P1*a* and the auxiliary crank pin die 13 at the location of the third rough crank pin portion P3*a* are disposed on the lower side.

Figure 15A:
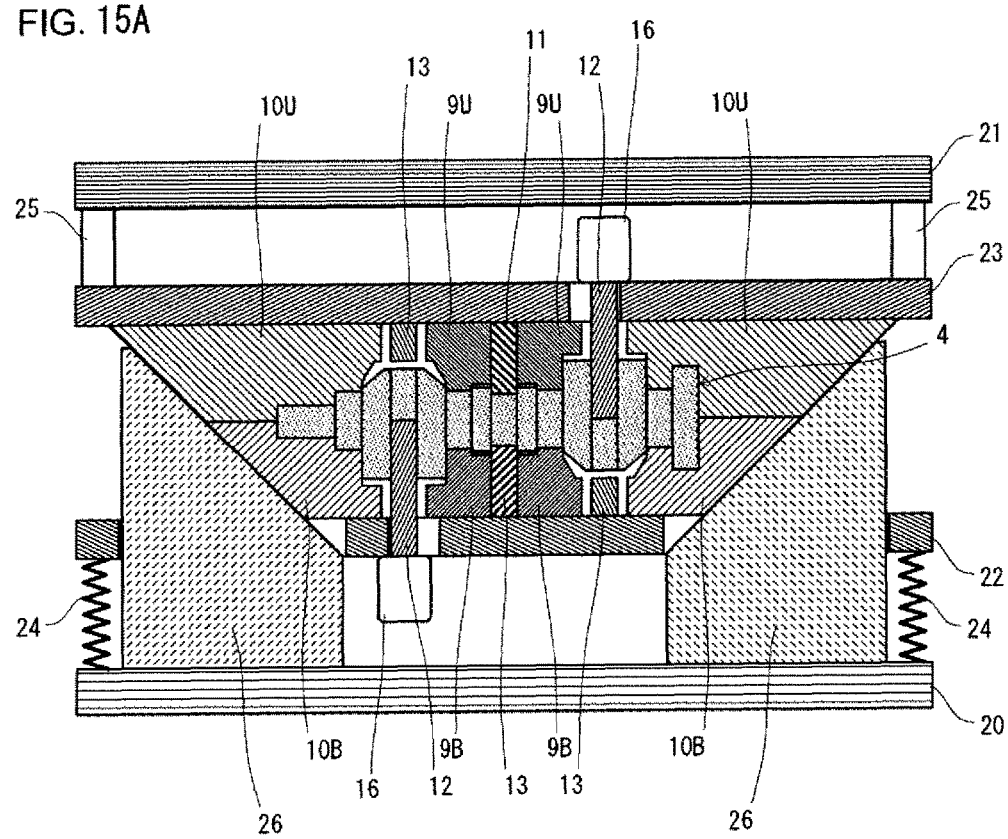
FIG. 15A is a longitudinal sectional view illustrating a process for forming a blank for finish forging using the forming apparatus according to the third embodiment shown in FIG. 14, with a forming state at an initial stage shown therein.
Figure 15B:
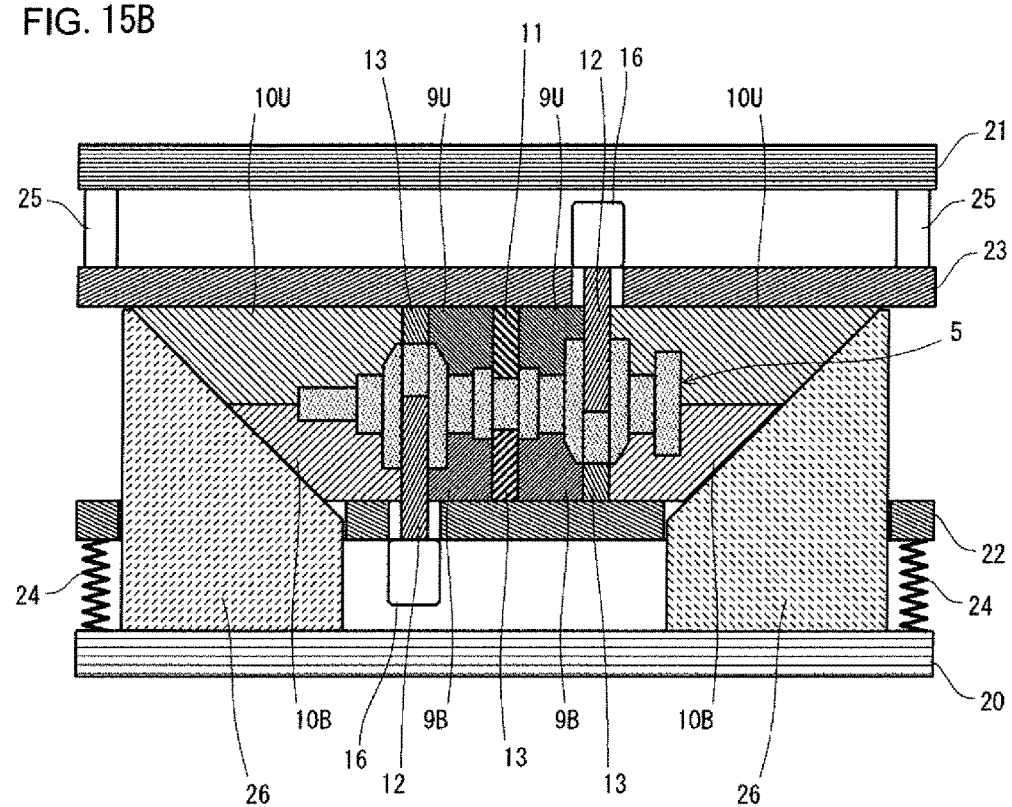
FIG. 15B is a longitudinal sectional view illustrating a process for forming a blank for finish forging using the forming apparatus according to the third embodiment shown in FIG. 14, with a forming state at the completion shown therein.

FIGS. 15A and 15B are longitudinal sectional views illustrating a process for forming a blank for finish forging using the forming apparatus according to the third embodiment shown in FIG. 14. Among these figures, FIG. 15A shows a forming state at an initial stage and 15B shows a forming state at the completion.

As shown in FIG. 15A, the preform blank 4 is placed in the lower movable journal dies 10B, stationary journal die 9B, movable crank pin dies 12, and auxiliary crank pin dies 13, and then the downward movement of the press machine is performed. Then, the movable journal dies 10U and 10B and the stationary journal dies 9U and 9B are caused to hold and retain the rough journal portions Ja of the preform blank 4 therebetween from above and below, and concurrently, the reference crank pin die 11 and the auxiliary crank pin dies 13 are caused to hold and retain the second rough crank pin portion P2*a* therebetween from above and below, bringing into a state in which the first and third rough crank pin portions P1*a* and P3*a* are in contact with the movable crank pin dies 12. In this state, the lowering of the press machine is continued. This allows the movable journal dies 10U and 10B holding and retaining each rough journal portion Ja to move axially toward the reference crank pin die 11 holding and retaining the second rough crank pin portion P2*a*. Concurrently, the movable crank pin dies 12 and the auxiliary crank pin dies 13 in contact with the first and third rough crank pin portions P1*a* and P3*a* are moved axially toward the reference crank pin die 11. By this operation, in the preform blank 4, the weighted rough arm portions Aa are axially compressed by the movable journal dies 10U and 10B, the stationary journal dies 9U and 9B, the reference crank pin die 11, and the movable crank pin dies 12, while the axial lengths of the rough journal portions Ja and the rough crank pin portions Pa are maintained. Then, the thickness of the weighted rough arm portions Aa is reduced to the thickness of the weighted rough arm portions Ab of the blank for finish forging 5 (see FIG. 15B).

Also, in coordination with the axial movement of the movable journal dies 10U and 10B as well as that of the movable crank pin dies 12 and the auxiliary crank pin dies 13, the movable crank pin dies 12 press the first and third rough crank pin portions P1*a* and P3*a* of the preform blank 4 in the vertical direction perpendicular to the axial direction by the operation of each hydraulic cylinders 16. By this operation, the first and third rough crank pin portions P1*a* and P3*a* of the preform blank 4 are displaced in the vertical direction perpendicular to the axial direction, thus the amount of eccentricity thereof in the opposite direction to each other is increased to an amount of eccentricity equal to a $\sqrt{3}/2$ of an amount of eccentricity in the crank pins P of the forged crankshaft (see FIGS. 12 and 15B). On the other hand, the location of the second rough crank pin portion P2*a* of the preform blank 4 in the vertical direction perpendicular to the axial direction remains unchanged before and after the forming, thus the amount of eccentricity thereof remains zero.

In this manner, it is possible to form, from the preform blank 4 without a flash, the blank for finish forging 5 without a flash, which has a shape generally in agreement with the shape of the forged crankshaft for the three-cylinder engine (forged final product) excluding the amount of eccentricity and the placement angle of all the crank pins P. Such a blank for finish forging 5 without a flash is supplied for finish forging, and finish forging is performed with it in a state in which the first and third rough crank pin portions P1*a* and P3*a* are horizontally positioned. In this process, by pressing all the rough crank pin portions of the blank for finish forging 5 in the vertical direction perpendicular to the axial direction so as to displace them to the specified positions, it is possible to obtain the final shape of the forged crankshaft for the three-cylinder engine including the contour shape of arms, and the amount of eccentricity and the placement angle of the crank pins, although some minor amount of flash is generated. Therefore, forged crankshafts for three-cylinder engines can be manufactured with high material utilization and also with high dimensional accuracy regardless of their shapes.

4. Fourth Embodiment

A fourth embodiment includes modifications of the configuration of the third embodiment.

4-1. Preform Blank, Blank for Finish Forging, and Forged Product

FIG. 16 is a diagram schematically showing the shapes of a preform blank to be processed by the forming apparatus, a blank for finish forging formed therefrom, and a forged product after finish forging, in the manufacturing method of the fourth embodiment.

As shown in FIG. 16, the forged product 6 of the fourth embodiment maintains the same shape as the forged product 6 of the third embodiment shown in FIG. 12.

In contrast, the blank for finish forging 5 of the fourth embodiment differs from the blank for finish forging 5 of the third embodiment shown in FIG. 12 in the following. As shown in FIG. 16, central second rough crank pin portion P2b of the blank for finish forging 5 of the fourth embodiment is configured to be eccentric in a direction perpendicular to an eccentric direction of the first and third rough crank pin portions P1b and P3b at opposite ends with an amount of eccentricity equal to that of the crank pin Pc of the forged product 6, i.e., that of the crank pin P of the forged crankshaft.

Further, the preform blank 4 of the fourth embodiment differs from the preform blank 4 of the third embodiment shown in FIG. 12 in the following. As shown in FIG. 16, central second rough crank pin portion P2a of the preform blank 4 of the fourth embodiment is configured to be eccentric in a direction perpendicular to an eccentric direction of first and third rough crank pin portions P1a and P3a at opposite ends with an amount of eccentricity equal to that of the crank pin P of the forged crankshaft (crank pin Pc of forged product 6), the configuration similar to that of the blank for finish forging 5.

4-2. Process for Manufacturing Forged Crankshaft

Figure 17:
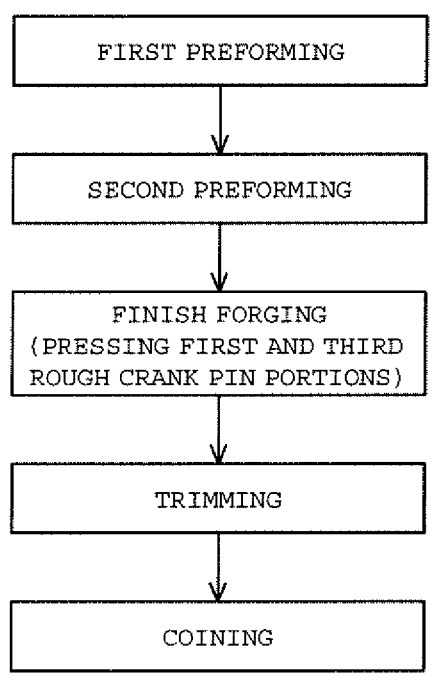
FIG. 17 is a schematic diagram illustrating a process for manufacturing a forged crankshaft according to the fourth embodiment.

FIG. 17 is a schematic diagram illustrating a process for manufacturing a forged crankshaft according to the fourth embodiment. As shown in FIG. 17, the process for manufacturing the forged crankshaft of the fourth embodiment, similar to the third embodiment shown in FIG. 13, includes a first preforming step, a second preforming step, and a the finish forging step, and also includes a trimming step and a coining step as necessary.

The first preforming step is a step in which the preform blank 4 described above is obtained.

The second preforming step is a step in which the blank for finish forging 5 described above is obtained. In the second preforming step, the same forming apparatus used in the third embodiment shown in FIGS. 14, 15A and 15B is used. It should be noted that in the longitudinal sectional view shown in FIG. 14, the second rough crank pin portion in the fourth embodiment is in reality located either in the front or back side of the paper.

In the second preforming step of the fourth embodiment, as similarly found in the third embodiment shown in FIGS. 14, 15A, and 15B, the preform blank 4 is placed in the lower journal die 10B, the stationary journal dies 9B, the movable crank pin die 12, and the auxiliary crank pin dies 13, and then the downward movement of the press machine is performed. This allows the movable journal dies 10U and 10B holding and retaining each rough journal portion Ja, and the movable crank pin dies 12 and the auxiliary crank pin dies 13 in contact with the first and third rough crank pin portions P1a and P3a to move axially toward the reference crank pin die 11 holding and retaining the second rough crank pin portion P2a. In conjunction with this movement, in the preform blank 4, the weighted rough arm portions Aa are axially compressed while the axial lengths of the rough journal portions Ja and the rough crank pin portions Pa are maintained. Then, the thickness of the weighted rough arm portions Aa is reduced to the thickness of the weighted rough arm portions Ab of the blank for finish forging 5.

Further, the first and third rough crank pin portions P1a and P3a are pressed by the movable crank pin dies 12 in the vertical direction perpendicular to the axial direction. In this manner, the first and third rough crank pin portions P1a and P3a of the preform blank 4 become eccentric in the opposite direction to each other with an amount of eccentricity increased to a $\sqrt{3}/2$ of an amount of eccentricity in the crank pins P of the forged crankshaft. On the other hand, the location of the second rough crank pin portion P2a of the preform blank 4 in the direction perpendicular to the axial direction remains unchanged before and after the forming, thus an amount of eccentricity remains the same as that of the crank pin P of the forged crankshaft.

In this manner, it is possible to form, from the preform blank 4 without a flash, the blank for finish forging 5 without a flash, which has a shape generally in agreement with the shape of the forged crankshaft for the three-cylinder engine (forged final product) excluding the amount of eccentricity and the placement angle of the first and third crank pins P1 and P3.

The finish forging step is a step in which the forged product 6 described above is obtained. In the finish forging step, the blank for finish forging 5 is supplied to be processed for finish forging in a state that in which the first and third rough crank pin portions are horizontally positioned. In this process, by pressing the first and third rough crank pin portions P1b and P3b of the blank for finish forging 5 in the vertical direction perpendicular to the axial direction so as to displace them to the specified positions, it is possible to obtain the forged product 6 having a shape in agreement with the shape of the crankshaft of the forged crankshaft for the three-cylinder engine having the final shape including the contour shape of arms, and the amount of eccentricity and the placement angle of the crank pins, although some minor amount of flash is generated.

The present invention is not limited to the embodiments described above, and various modifications may be made without departing from the spirit and scope of the present invention. For example, the mechanism for causing the movable journal dies to move axially is not limited to the one described in the above embodiments, in which a wedge mechanism of a press machine is employed. Alternatively, a link mechanism may be employed, or a hydraulic cylinder or a servo motor or the like may be employed in place of the press machine. Furthermore, the mechanism for causing the crank pin dies to move in the direction perpendicular to the axial direction is not limited to a hydraulic cylinder, and it may be a servo motor.

In the embodiments described above, the inclined surfaces are provided to the end surface of the movable journal dies, as wedge mechanisms to move axially the movable journal dies, and wedges are provided correspondingly to these inclined surfaces. As wedge mechanisms instead to this, a block having an inclined surface may be fixed to a side section outside the first impression and the second impression of the movable journal die, and a wedge may be provided correspondingly to the inclined surface of this block.

Furthermore, the embodiments described above have such a configuration that the upper die holder is secured to the upper pressure pad while the lower die holder is resiliently supported on the lower pressure pad on which the wedges are installed, and the upper and lower movable journal dies are allowed to move by the wedges, but alternatively, the functions of the upper section and the lower section may be reversed. The configuration may also be such that the upper and lower die holders are resiliently supported on the corresponding pressure pads, and that wedges are installed on both pressure pads so that the upper and lower movable journal dies are caused to move by their corresponding wedges.

Furthermore, in the above embodiments, the auxiliary crank pin dies are movable only axially, but they may be made to be movable also in a direction toward the crank pin dies forming pairs. In this case, the crank pin dies and the auxiliary crank pin dies hold and retain the rough crank pin portions Pa therebetween from above and below and meanwhile move in the direction perpendicular to the axial direction cooperatively with each other.

Furthermore, the embodiments described above have such a configuration that the rough crank pin portions Pa are pressed in the vertical direction by moving the crank pin dies in the direction perpendicular to the axial direction, however the configuration may also be such that the locations of the crank pin dies and the journal dies are changed so as to horizontally press the rough crank pin portions Pa.

INDUSTRIAL APPLICABILITY

The present invention is useful in manufacturing forged crankshafts for three-cylinder engines.

REFERENCE SIGNS LIST

1: forged crankshaft
J, J1 to J4: journals
P, P1 to P3: crank pins
Fr: front part
Fl: flange
A, A1 to A6: crank arms
2: billet
4: preform blank
Ja, J1a to J4a: rough journal portions
Pa, P1a to P3a: rough crank pin portions
Fra: rough front part portion
Fla: rough flange portion
Aa, A1a to A6a: rough crank arm portions
5: blank for finish forging
Jb, J1b to J4b: rough journal portions of blank for finish forging
Pb, P1b to P3b: rough crank pin portions of blank for finish forging
Frb: rough front part portion of blank for finish forging
Flb: rough flange portion of blank for finish forging
Ab, A1b to A6b: rough crank arm portions of blank for finish forging
5a: fin flaws
6: forged product
Jc, J1c to J4c: journals of forged product
Pc, P1c to P3c: crank pins of forged product
Frc: front part of forged product
Flc: flange of forged product
Ac, A1c to A6c: crank arms of forged product
7: twisted product
Jd, J1d to J4d: journals of twisted product
Pd, P1d to P3d: crank pins of twisted product
Frd: front part of twisted product
Fld: flange of twisted product
Ad, A1d to A6d: crank arms of twisted product
9U, 9B: stationary journal dies
9Ua, 9Ba: first impression of stationary journal die
9Ub, 9Bb: second impression of stationary journal die
9Uc, 9Bc: third impression of stationary journal die
10U, 10B: movable journal dies
10Ua, 10Ba: first impression of movable journal die
10Ub, 10Bb: second impression of movable journal die
11: reference crank pin die
11a: impression
12: movable crank pin die
12a: impression
13: auxiliary crank pin die
13a: impression
14U, 14B: inclined surfaces of journal dies for first and fourth rough journal portions
16: hydraulic cylinder
20: lower pressure pad
21: upper pressure pad
22: lower die holder
23: upper die holder
24: resilient member
25: support post
26: wedge

The invention claimed is:

1. An apparatus for forming a blank for finish forging for a forged crankshaft for a three-cylinder engine in which third and fourth crank arms connecting with a second crank pin in a center have no balance weights and remaining crank arms have balance weights, the apparatus configured to form, from a preform blank, in a process of manufacturing the forged crankshaft for a three-cylinder engine, the blank for finish forging to be subjected to finish forging by which a final shape of the forged crankshaft is obtained,
the preform blank including:
rough journal portions having an axial length equal to an axial length of journals of the forged crankshaft;
rough crank pin portions having an axial length equal to an axial length of crank pins of the forged crankshaft;
third and fourth rough crank arm portions corresponding to the third and fourth crank arms of the forged crankshaft, having an axial thickness equal to an axial thickness of such crank arms; and
weighted rough crank arm portions corresponding to weighted crank arms having the balance weights of the forged crankshaft, having an axial thickness greater than an axial thickness of such crank arms,
the rough crank pin portions of the preform blank having a smaller amount of eccentricity in a direction perpendicular to an axial direction than an amount of eccentricity of the crank pins of the forged crankshaft,
the forming apparatus comprising:
a reference crank pin die disposed at a location of the second rough crank pin portion, the reference crank pin die configured to be brought into contact with the second rough crank pin portion, the reference crank pin die configured to move in a direction perpendicular to the axial direction, but be constrained from moving axially, while being in contact with side surfaces of the third and fourth rough crank arm portions through which the third and fourth rough crank arm portions connect with the second rough crank pin portion;

movable crank pin dies disposed at locations of the corresponding first and third rough crank pin portions at opposite ends, the movable crank pin dies configured to be brought into contact with the first and third rough crank pin portions, the movable crank pin dies configured to move axially toward the reference crank pin die and in the direction perpendicular to the axial direction, while being in contact with side surfaces of the rough crank arm portions through which the rough crank arm portions connect with the first and third rough crank pin portions;

stationary journal dies disposed at locations of the rough journal portions connecting with the third and fourth rough crank arm portions, the stationary journal dies configured to hold and retain such rough journal portions therebetween in the direction perpendicular to the axial direction, the stationary journal dies configured to be constrained from moving axially while being in contact with side surfaces of the third and fourth rough crank arm portions; and movable journal dies disposed at locations of the corresponding rough journal portion excluding the rough journal portions connecting with the third and fourth rough crank arm portions, the movable journal dies configured to hold and retain such rough journal portions therebetween in the direction perpendicular to the axial direction, the movable journal dies configured to move axially toward the reference crank pin die while being in contact with side surfaces of the rough crank arm portions through which the rough crank arm portions connect with such rough journal portions, wherein, in a state where the rough journal portions are held and retained by the stationary journal dies and the movable journal dies, and the rough crank pin portions are contacted by the reference crank pin die and the movable crank pin dies, the movable journal dies are moved axially, the movable crank pin dies are moved axially and in the direction perpendicular to the axial direction, and the reference crank pin die is moved in the direction perpendicular to the axial direction, thereby compressing the weighted rough crank arm portions in the axial direction so as to reduce the thickness thereof to the thickness of the weighted crank arms of the forged crankshaft, and pressing the rough crank pin portions in the direction perpendicular to the axial direction so as to increase the amount of eccentricity thereof to the amount of eccentricity of the crank pins of the forged crankshaft.

2. The apparatus for forming a blank for finish forging for a forged crankshaft for a three-cylinder engine according to claim 1, wherein the reference crank pin die and the movable crank pin dies each includes an auxiliary crank pin die disposed at a location outside of the corresponding rough crank pin portion, opposite to the side where the reference crank pin die and the movable crank pin dies are contacted, and wherein in conjunction with the axial movement of the movable journal dies as well as that of the movable crank pin dies and the auxiliary crank pin dies forming pairs therewith, a movement of the movable crank pin dies in the direction perpendicular to the axial direction is controlled in a manner that the rough crank pin portions to be deformed by pressing reach the auxiliary crank pin dies after spaces between the movable journal dies, and the movable crank pin dies and the auxiliary crank pin dies are filled.

3. The apparatus for forming a blank for finish forging for a forged crankshaft for a three-cylinder engine according to claim 2, wherein, provided that a total length of movement of the movable crank pin dies in the direction perpendicular to the axial direction is a 100% length of movement thereof, when the axial movement of the movable journal dies that are adjacent to such movable crank pin dies is completed, a length of movement of such movable crank pin dies in the direction perpendicular to the axial direction is 90% or less of the total length of movement, and thereafter, the movement of such movable crank pin dies in the direction perpendicular to the axial direction is completed.

4. The apparatus for forming a blank for finish forging for a forged crankshaft for a three-cylinder engine according to claim 1, wherein the reference crank pin die, the movable crank pin dies, the stationary journal dies, and the movable journal dies are mounted on a press machine that is capable of being moved downward along the direction perpendicular to the axial direction, and wherein, by the downward movement of the press machine, the stationary journal dies and the movable journal dies are caused to hold and retain the rough journal portions therebetween, the reference crank pin die and the movable crank pin dies are brought into contact with the rough crank pin portions, and with continued downward movement of the press machine, the movable journal dies are moved axially by wedge mechanisms, and the movable crank pin dies are caused to move axially by the movement of the movable journal dies.

5. The apparatus for forming a blank for finish forging for a forged crankshaft for a three-cylinder engine according to claim 4, wherein the wedge mechanisms have different wedge angles for each of the movable journal dies.

6. The apparatus for forming a blank for finish forging for a forged crankshaft for a three-cylinder engine according to claim 4 or 5, wherein the reference crank pin die and the movable crank pin dies are coupled to hydraulic cylinders and caused to move in the direction perpendicular to the axial direction by driving the hydraulic cylinders.

7. An apparatus for forming a blank for finish forging for a forged crankshaft for a three-cylinder engine in which third and fourth crank arms connecting with a second crank pin in a center have no balance weights and remaining crank arms have balance weights, the apparatus configured to form, from a preform blank, in a process of manufacturing the forged crankshaft for a three-cylinder engine, the blank for finish forging to be subjected to finish forging by which a final shape of the forged crankshaft is obtained, the preform blank including:

rough journal portions having an axial length equal to an axial length of journals of the forged crankshaft;

first, second and third rough crank pin portions having an axial length equal to an axial length of crank pins of the forged crankshaft;

third and fourth rough crank arm portions corresponding to the third and fourth crank arms of the forged crankshaft, having an axial thickness equal to an axial thickness of such crank arms; and weighted rough crank arm portions corresponding to weighted crank arms having the balance weights of the forged crankshaft, having an axial thickness greater than an axial thickness of such crank arms, the forming apparatus comprising:

reference crank pin die disposed at a location of the second rough crank pin portion, the reference crank pin die configured to be brought into contact with the second rough crank pin portion, the reference crank pin die configured to be constrained from moving axially while being in contact with side surfaces of the third and fourth rough crank arm portions through which the rough crank arm portions connect with the second rough crank pin portion;

movable crank pin dies disposed at locations of the corresponding first and third rough crank pin portions, the movable crank pin dies configured to be brought into contact with the first and third rough crank pin portions, the movable crank pin dies configured to move axially toward the reference crank pin die and in the direction perpendicular to the axial direction, while being in contact with side surfaces of the rough crank arm portions through which the rough crank arm portions connect with the first and third rough crank pin portions;

stationary journal dies disposed at locations of the rough journal portions connecting with the third and fourth rough crank arm portions, the stationary journal dies configured to hold and retain such rough journal portions therebetween in the direction perpendicular to the axial direction, the stationary journal dies configured to be constrained from moving axially, while being in contact with side surfaces of the third and fourth rough crank arm portions; and movable journal dies disposed at locations of the corresponding rough journal portion excluding the rough journal portions connecting with the third and fourth rough crank arm portions, the movable journal dies configured to hold and retain such rough journal portions therebetween in the direction perpendicular to the axial direction, the movable journal dies configured to move axially toward the reference crank pin die while being in contact with side surfaces of the rough crank arm portions through which the rough crank arm portions connect with such rough journal portions, wherein, in a state where the rough journal portions are held and retained by the stationary journal dies and the movable journal dies, and the rough crank pin portions are contacted by the reference crank pin die and the movable crank pin dies, the movable journal dies are moved axially and the movable crank pin dies are moved axially and in the direction perpendicular to the axial direction, thereby compressing the weighted rough crank arm portions in the axial direction so as to reduce the thickness thereof to the thickness of the weighted crank arms of the forged crankshaft, and pressing the first and third rough crank pin portions in the direction perpendicular to the axial direction but in an opposite direction to each other, so as to increase an amount of eccentricity thereof to the $\sqrt{3}/2$ of an amount of eccentricity of the crank pins of the forged crankshaft.

8. The apparatus for forming a blank for finish forging for a forged crankshaft for a three-cylinder engine according to claim 7, wherein the apparatus configured to form the blank for finish forging from a preform blank, the preform blank including:

rough journal portions having an axial length equal to an axial length of journals of the forged crankshaft;

first, second and third rough crank pin portions having an axial length equal to an axial length of crank pins of the forged crankshaft;

third and fourth rough crank arm portions corresponding to the third and fourth crank arms of the forged crankshaft, having an axial thickness equal to an axial thickness of such crank arms; and weighted rough crank arm portions corresponding to weighted crank arms having the balance weights of the forged crankshaft, having an axial thickness greater than an axial thickness of such crank arms, the first and third rough crank pin portions at opposite ends of the preform blank having an amount of eccentricity in a direction perpendicular to the axial direction in the opposite direction to each other, the amount of eccentricity thereof being smaller than a $\sqrt{3}/2$ of an amount of eccentricity of the crank pins of the forged crankshaft, the second rough crank pin portion in the center of the preform blank having an amount of eccentricity of zero in the direction perpendicular to the axial direction or having an amount of eccentricity in a direction perpendicular to an eccentric direction of the first and third rough crank pin portions, the amount of eccentricity thereof being equal to the amount of eccentricity of the crank pins of the forged crankshaft.

9. The apparatus for forming a blank for finish forging for a forged crankshaft for a three-cylinder engine according to claim 7, wherein the reference crank pin die and the movable crank pin dies each includes an auxiliary crank pin die disposed at a location outside of the corresponding rough crank pin portion, opposite to the side where the reference crank pin die and the movable crank pin dies are contacted, and wherein in conjunction with the axial movement of the movable journal dies as well as that of the movable crank pin dies and the auxiliary crank pin dies forming pairs therewith, a movement of the movable crank pin dies in the direction perpendicular to the axial direction is controlled in a manner that the rough crank pin portions to be deformed by pressing reach the auxiliary crank pin dies after spaces between the movable journal dies, and the movable crank pin dies and the auxiliary crank pin dies are filled.

10. The apparatus for forming a blank for finish forging for a forged crankshaft for a three-cylinder engine according to claim 9, wherein, provided that a total length of movement of the movable crank pin dies in the direction perpendicular to the axial direction is a 100% length of movement thereof, when the axial movement of the movable journal dies that are adjacent to such movable crank pin dies is completed, a length of movement of such movable crank pin dies in the direction perpendicular to the axial direction is 90% or less of the total length of movement, and thereafter, the movement of such movable crank pin dies in the direction perpendicular to the axial direction is completed.

11. The apparatus for forming a blank for finish forging for a forged crankshaft for a three-cylinder engine according to claim 7, wherein the reference crank pin die, the movable crank pin dies, the stationary journal dies, and the movable journal dies are mounted on a press machine that is capable of being moved downward along the direction perpendicular to the axial direction, and wherein, by the downward movement of the press machine, the stationary journal dies and the movable journal dies are caused to hold and retain the rough journal portions therebetween, the reference crank pin die and the movable crank pin dies are brought into contact with the rough crank pin portions, and with continued downward movement of the press machine, the movable journal dies are moved axially by wedge mechanisms, and the movable crank pin dies are caused to move axially by the movement of the movable journal dies.

12. The apparatus for forming a blank for finish forging for a forged crankshaft for a three-cylinder engine according to claim 11,
wherein the wedge mechanisms have different wedge angles for each of the movable journal dies.

13. The apparatus for forming a blank for finish forging for a forged crankshaft for a three-cylinder engine according to claim 11,
wherein the movable crank pin dies are coupled to hydraulic cylinders and caused to move in the direction perpendicular to the axial direction by driving the hydraulic cylinders.

14. A method for forming a forged crankshaft for a three-cylinder engine in which third and fourth crank arms connecting with a second crank pin in a center have no balance weights and remaining crank arms have balance weights, comprising the successive steps of:
a first preforming step for forming, as the preform blank to be supplied to the forming apparatus according to claim 1, a preform blank in which first and third rough crank pin portions at opposite ends have an amount of eccentricity in a direction perpendicular to the axial direction in the opposite direction to each other, the amount of eccentricity thereof being equal to a $\sqrt{3}/2$ of an amount of eccentricity of the crank pins of the forged crankshaft, and a second rough crank pin portion in the center has an amount of eccentricity in the direction perpendicular to the axial direction, in a direction perpendicular to an eccentric direction of the first and third rough crank pin portions, the amount of eccentricity thereof being smaller than the amount of eccentricity of the crank pins of the forged crankshaft;
a second preforming step for forming, as the blank for finish forging, a blank for finish forging in which a final shape of the forged crankshaft is formed including a placement angle of the crank pins using the forming apparatus; and
a finish forging step for, by performing finish forging on the blank for finish forging, forming a forged product having the final shape of the forged crankshaft including the placement angle of the crank pins.

15. A method for forming a forged crankshaft for a three-cylinder engine in which third and fourth crank arms connecting with a second crank pin in a center have no balance weights and remaining crank arms have balance weights, comprising the successive steps of:
a first preforming step for forming, as the preform blank to be supplied to the forming apparatus according to claim 1, a preform blank in which first and third rough crank pin portions at opposite ends have an amount of eccentricity in a direction perpendicular to the axial direction in the same direction, the amount of eccentricity thereof being smaller than an amount of eccentricity of the crank pins of the forged crankshaft, and a second rough crank pin portion in the center has an amount of eccentricity in the direction perpendicular to the axial direction, in the opposite direction of an eccentric direction of the first and third rough crank pin portions, the amount of eccentricity thereof being smaller than the amount of eccentricity of the crank pins of the forged crankshaft;
a second preforming step for forming, as the blank for finish forging, a blank for finish forging in which a final shape of the forged crankshaft is formed excluding a placement angle of the crank pins using the forming apparatus;
a finish forging step for forming, by performing finish forging on the blank for finish forging, a forged product having the final shape of the forged crankshaft excluding the placement angle of the crank pins; and
a twisting step for adjusting the placement angle of the crank pins of the forged product to the placement angle of the crank pins of the forged crankshaft.

16. A method for forming a forged crankshaft for a three-cylinder engine in which third and fourth crank arms connecting with a second crank pin in a center have no balance weights and remaining crank arms have balance weights, comprising the successive steps of:
a first preforming step for forming, as the preform blank to be supplied to the forming apparatus according to claim 7, a preform blank in which the first and third rough crank pin portions at opposite ends have an amount of eccentricity in a direction perpendicular to the axial direction in the opposite direction to each other, the amount of eccentricity thereof being smaller than a $\sqrt{3}/2$ of an amount of eccentricity of the crank pins of the forged crankshaft, and the second rough crank pin portion in the center has the amount of eccentricity of zero in the direction perpendicular to the axial direction;
a second preforming step for forming, using the forming apparatus, as the blank for finish forging, a blank for finish forging in which first and third rough crank pin portions at opposite ends have an amount of eccentricity in the direction perpendicular to the axial direction in the opposite direction to each other, the amount of eccentricity thereof being equal to the $\sqrt{3}/2$ of the amount of eccentricity of the crank pins of the forged crankshaft, and a second rough crank pin portion in the center remains the same amount of eccentricity in the direction perpendicular to the axial direction as the preform blank; and
a finish forging step for forming a forged product having a final shape of the forged crankshaft including a placement angle of the crank pins by performing finish forging on the blank for finish forging in a state in which the first and third rough crank pin portions at opposite ends are horizontally positioned whereby all the rough crank pin portions are pressed in the direction perpendicular to the axial direction.

17. A method for forming a forged crankshaft for a three-cylinder engine in which third and fourth crank arms connecting with a second crank pin in a center have no balance weights and remaining crank arms have balance weights, comprising the successive steps of:
a first preforming step for forming, as the preform blank to be supplied to the forming apparatus according to claim 7, a preform blank in which first and third rough crank pin portions at opposite ends have an amount of eccentricity in a direction perpendicular to the axial direction in the opposite direction to each other, the amount of eccentricity thereof being smaller than a $\sqrt{3}/2$ of an amount of eccentricity of the crank pins of the forged crankshaft, and a second rough crank pin portion in the center has an amount of eccentricity in the direction perpendicular to the axial direction, in a direction perpendicular to an eccentric direction of the first and third rough crank pin portions, the amount of eccentricity thereof being equal to the amount of eccentricity of the crank pins of the forged crankshaft;

a second preforming step for forming, using the forming apparatus, as the blank for finish forging, a blank for finish forging in which the first and third rough crank pin portions at opposite ends have an amount of eccentricity in the direction perpendicular to the axial direction in the opposite direction to each other, the amount of eccentricity thereof being equal to the $\sqrt{3}/2$ of the amount of eccentricity of the crank pins of the forged crankshaft, and the second rough crank pin portion in the center remains the same amount of eccentricity in the direction perpendicular to the axial direction as the preform blank; and a finish forging step for forming a forged product having a final shape of the forged crankshaft including a placement angle of the crank pins by performing finish forging on the blank for finish forging in a state in which the first and third rough crank pin portions at opposite ends are horizontally positioned whereby the first and third rough crank pin portions are pressed in the direction perpendicular to the axial direction.

\* \* \* \* \*